INVENTOR.
ROBERT S. BRADFORD
BY Smyth, Roston & Pavitt
ATTORNEYS.

DIGITAL DATA TRANSFER SYSTEM

Filed July 14, 1965 5 Sheets-Sheet 2

INVENTOR
ROBERT S. BRADFORD
BY Smyth, Roston & Pavitt
ATTORNEYS.

INVENTOR
ROBERT S. BRADFORD
BY Smyth, Roston & Pavitt
ATTORNEYS.

INVENTOR
ROBERT S. BRADFORD
BY Smyth, Roston & Pavitt
ATTORNEYS.

INVENTOR
ROBERT S. BRADFORD
BY Smyth, Roston & Pavitt
ATTORNEYS

United States Patent Office 3,406,378

Patented Oct. 15, 1968

3,406,378

DIGITAL DATA TRANSFER SYSTEM

Robert S. Bradford, Tarzana, Calif., assignor to Minnesota Mining and Manufacturing Company, St. Paul, Minn., a corporation of Delaware Filed July 14, 1965, Ser. No. 471,959
47 Claims. (Cl. 340—172.5)

ABSTRACT OF THE DISCLOSURE

This invention relates to a system for controlling the transfer of data between a movable storage medium such as a magnetic tape and a data processing system on an asynchronous basis. The system includes a buffer for storing such data and means for providing for the passage of data into the buffer from a particular one of the movable storage medium and the data processing system at a rate dependent upon the passage of the data from the buffer to the other one of the movable storage medium and the data processing system. For example, the movable storage medium is moved at an increased rate past transducer means connected to the buffer to provide an increased transfer of data into the buffer when data is transferred from the buffer to the data processing system at an increased rate.

The invention also includes a number of features for facilitating and insuring the proper operation of the asynchronous system. For example, the data is often recorded in the form of characters separated by inter-record gaps. Means are provided for obtaining a movement of the medium through the inter-record gaps upon the completion of the transducing action upon the characters. Furthermore, the characters are recorded in a plurality of bits transverse to the direction of movement of the movable storage medium. Means are provided for offsetting any skew in the disposition of such transverse bits relative to the transducing means.

When characters are introduced into the buffer, they are transferred through the buffer from the input side to the output side at a rate faster than the transfer of characters into or out of the buffer. This facilitates an instantaneous transfer of the characters from the buffer. Furthermore, the transfer of characters from the buffer is controlled by the relative rate at which the characters are transferred into and out of the buffer.

When data characters are being transferred from the buffer to the data processing system, movement of the movable storage medium is stopped at such times as the buffer has become loaded to a relatively high level having a particular value. However, when data characters are being transferred from the data processing system to the buffer, movement of the movable storage medium is stopped at such times as the buffer has become emptied to a relatively low and predetermined level.

The present invention relates to a digital data transfer system to be interconnected between two data processing systems. For example, in the preferred configuration the data transfer system will control the traffic of digital data between a data processing unit such as a computer and a storage unit such as a tape recording and reproducing device. The transfer system permits the control of such data flow in any direction as far as the two processing systems are concerned, i.e., either system may issue and receive data.

Neither the source for such data nor the device receiving data transferred are of specific interest as far as the specific purpose and design of either are concerned, however, the invention solves problems that arise in the data communication between a digital computer and a magnetic storage unit of the non-random access type, such as a magnetic tape. The problems, however, are inherent for all those data communication systems which operate mutually independently and without synchronization so that the data flow between them cannot simply be turned on or off to flow at a fixed maximum rate.

For example, data issued by a computer to be recorded on a magnetic tape usually will be issued by the computer or any other processor completely at random as far as the storage unit is concerned. Such data may issue individually and irregularly, or such data may be issued in "blocks" or groups to be recorded on the tape as a "record," whereby all the "characters," each defined as a group of usually seven bits and pertaining to a record will be recorded closely together on the tape at a fixed data density measured in the direction of tape movement. There may be a pause before and after the recording of such a record, while the computer when delivering the characters of the record wishes to issue them as fast as possible. The same holds true for data retrieval in that data may at times be read from the tape as fast as possible with long pauses occurring between readings. Such basically random operation requires the magnetic tape unit to be normally at rest, since the times of data supply or demand are uncertain.

Two types of recording devices are known. In one type, recording as well as reading requires constant tape speed, which means that neither may commence until the tape has been accelerated to full speed. The other type of recording device has what is known as incremental drive in which the tape is moved stepwise by one character spacing for each move, and a character is recorded when the tape is at rest. The latter type is necessarily slow for all those cases in which the processor issues a large quantity of data; the former type cannot be used at all in case the processor issues data rarely individually and at random. As it is high undesirable to record data on the tape in an irregular spacing, usually for reasons of bit value recognition, data are recorded conventionally at constant tape speed or by such incremental step drive system, each one limited for specific uses.

The invention permits data recording and reproducing without regard for the instantaneous tape speed and the rate of data issue. The inventive transfer system has as one principal component a buffer receiving data as they issue from the computer (during recording) or as they are read from the tape; in each case, regardless of the degree of regularity or speed of data flow, the data, of course, occur within a preset upper limit. The data are temporarily stored in the buffer and may be withdrawn therefrom for recording in strict dependence upon the desired density of recording irrespective of the instantaneous tape speed of the rate of withdrawal and of the rate of data supply to the buffer input side. For reading, the data are drawn from the buffer as demanded by the processor.

If the buffer is of the shifting type, the transfer of characters therethrough is supervised and controlled by a circuit network that traces each character as it travels through the buffer, and this network specifically causes a character to run through the buffer in a manner that prevents overlapping, overtaking, diffusion on any other error that would result if the bits of one character would occupy storage locations or places already occupied by the bits of another character.

The network establishes a representation of the filling state of the buffer and thus operates as a two-way counter. Each character set into the buffer adds a count unit to the content of the counter; each character withdrawn from the buffer subtracts a count unit from the counter. The counting state is used to control the tape drive, in that during recording a buffer content increase causes the tape to be accelerated so as to permit faster character withdrawal. By withdrawing characters at a rate proportionate to the tape speed and by controlling the tape drive from the buffer content, a feedback loop with negative feedback is established. In view of this loop, it can also be said that the buffer content controls its own withdrawal rate. For reading, the tape drive is controlled in the opposite sense, it is decelerated when the buffer content increases, since in the tape reading case the buffer will tend to fill up when the computer is somewhat slow in its data withdrawal.

From a general point of view, the buffer content metering device, i.e., the counter, is used to control the rate of data withdrawal or supply to the buffer. The buffer itself accommodates operational differences of the two communicating systems without enforcing a specific behavior of one upon the other. In the tape-computer communication case, the specific requirement for the tape is a constant bit spacing, while the computer prefers to operate in most cases at a constant rate, both for data issuing or reception, without, however, being restricted to such regularity. In no case does the computer have to wait until the tape has attained a particular operating condition, nor is the tape unit compelled to follow "blindly" the regular or irregular rate of data supply by the processor. As will be developed in detail below, the buffer permits the tape to start and the recorder to place characters accurately on the tape, while the computer can provide such data independently from the recording and tape motion processes. As the buffer content controls the tape motion, it in effect averages out the transition period from the idle state of the tape to the full speed recording state without requiring the tape unit to process the characters as they are issued. Of course, for extended recordings, the average recording rate must approximate the average issue rate; otherwise the buffer will attain a forbidding size. On the other hand the tape motion may never be uniform or constant as long as the buffer is not overloaded. It seems suitable to speak of an asynchronous tape drive.

If the computer or any other processor issues data rarely, it is not necessary to record the data as they are issued. Several characters may be accumulated in the buffer before recording thereof. In the read case, the computer may simply stop to withdraw data after having read one or a group of characters. Other data may then have already been read, they are simply stored in the buffer and since they are not withdrawn, the buffer will tend to fill up thus thereby causing the tape drive to stop. These characters will remain in the buffer until the computer decides to withdraw them. This latter aspect shows that the two systems are not influencing each other by their respective deficiencies. The computer can start to withdraw data exactly when it needs them, and the resulting depletion of the buffer of characters read long ago causes the tape drive to be set into motion and thereby reading is resumed.

The buffer may operate as shifting buffer in a parallel-by-bit, serial-by-character format, but alternatively a serial-by-bit and character format may be used for transfer with parallel character input and output operations. While shifting buffers with static bit-storing stages is preferred, a delay line may well be used and proven to be more economical in case a large buffer is required. The buffer may also be of the matrix type whereby characters are placed into empty storage locations, held in such a location until withdrawn for processing or recording.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawing in which:

Figure 1:
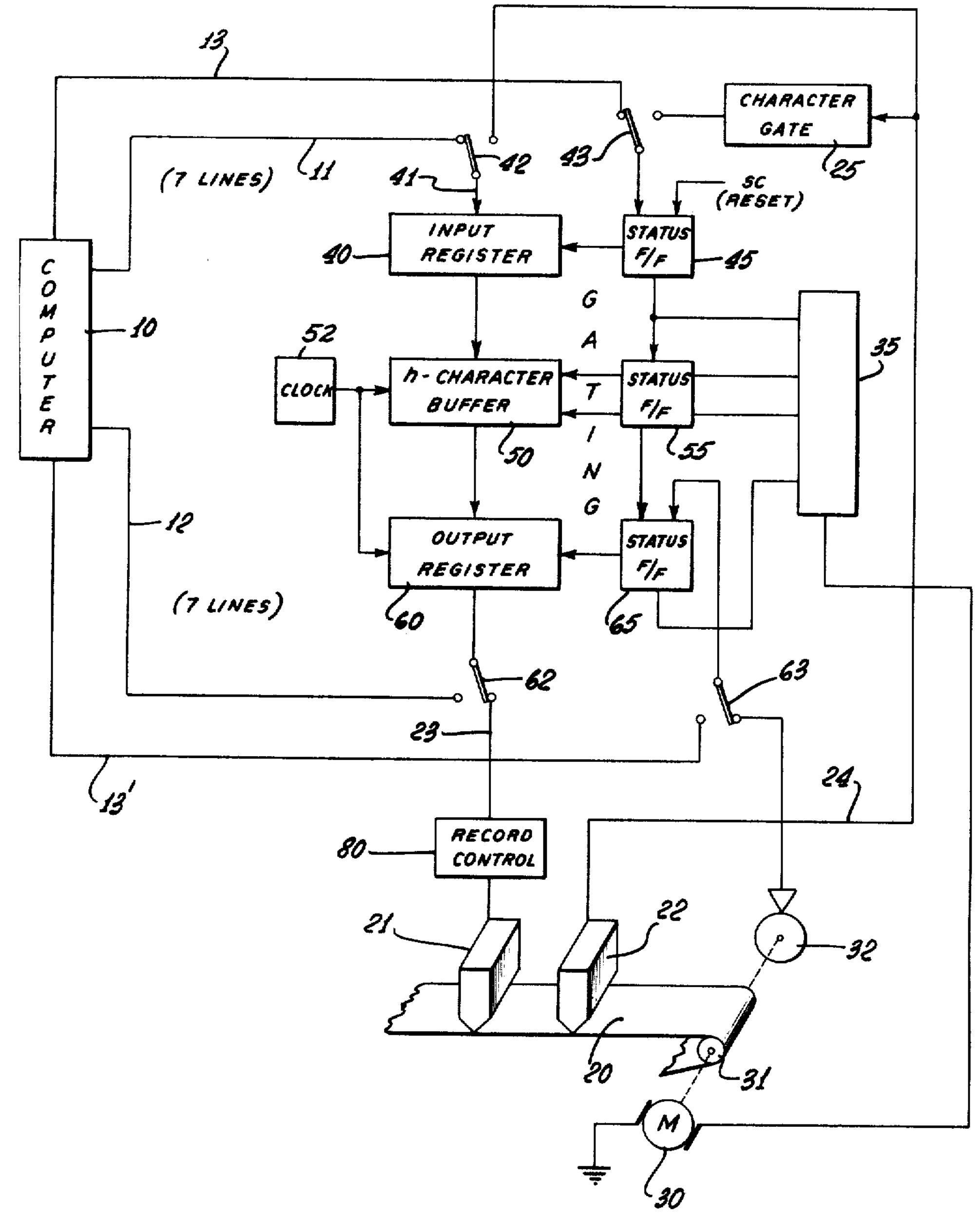
FIG. 1 illustrates somewhat schematically a block diagram for the preferred embodiment of the present invention wherein a data processor is coupled to a tape recording and reproducing unit by means of a buffer used further to control the tape drive.

Proceeding now to the detailed description of the drawings, in FIGURE 1, thereof, there is shown an overall view of an asynchronous, magnetic tape recording and reproducing system for storing and retrieving digital information. In particular, the system illustrated is a digital data transfer system providing communication between, for example, a data processing system such as a computer 10 and a magnetic tape 20. The computer 10 may have seven parallel data output channels 11 and seven parallel data input channels 12, which for example may be input and output channels of a seven stage computer buffer register. Hence, the computer will issue or receive characters sequentially and in a seven bit-parallel format.

This format has per se no bearing on the invention but is illustrative only as to the most common digital data format. Any format can be accommodated including straight serial presentation of data by the processor.

The magnetic tape 20 is driven by a motor 30 to which is coupled a capstan 31. The capstan 31 proper drives the tape 20 preferably in slippage-free or substantially slippage-free engagement therewith. The details of the tape drive are of no concern here, however, it is of importance that a drive be selected in which the circumferential speed of the capstan equals the tape speed within very small tolerances.

There are provided seven, parallelly positioned recording transducers 21 destined to magnetically inscribe characters on the tape 20 in seven parallel tracks and in a parallel by bit (seven bits) relationship thereon. The record transducer assembly 21 has seven input channels 23 which include record control means 80 for transforming the waveform of digit bit representation in a register into the waveform used for controlling the recording transducer so that the read transducers 22 have seven output channels 24. It should be noted that no special sync track is provided.

Since the principle of the invention does not depend on any specific recording mode, the record carrier may be a photographic film or a punched tape, the recording transducer then being an appropriate electro-optical or electro-mechanical converter. The magnetic tape may be substituted by a drum or a disk, if desired or required for the specific purposes. Hence, the invention is related only to the transfer of digital signals between a processor and a storage medium of the non-random type.

The transfer and buffer system which is the principal subject of the present invention is destined to couple the seven computer output channels 11 to the record transducer 21 during the recording mode, while substantially the same transfer system is employed to couple the seven output channels 24 of the read transducers 22 to the seven computer input channels 12.

This buffer system includes the following principal elements. There is first provided a seven stage parallel register 40 basically comprised of seven flip-flops which more or less independently receive signals from seven input channels 41. These channels 41 may selectively be connected to the seven computer output channels 11 or to the read transducer output channels 24 using a switch assembly 42.

The input register 40 applies its output signals to a transfer register 50. From a general point of view, the transfer register 50 must be capable of holding the bits of *n*-characters, whereby the characters are sequentially loaded into the transfer register, and they can be withdrawn from the transfer register in the same sequence but at a rate independent from the rate of loading. In the preferred form, register 50 will admit a character on one of its sides, pass (shift) the character through to permit withdrawal from the other side. It is basically immaterial whether the bits are passed through register 50 in a serial-by-bit and serial-by-character format or in a parallel-by-bit, serial-by-character format. The specific selection of the transfer register is primarily a matter of cost considerations.

As a representative example, the transfer register 50 may be composed of seven registers. Each shift register has *n* stages and has its input side respectively connected to one of the stages of the input register 40. A character as defined by seven bits is loaded at times into the seven stage, parallel input register 40, and shifted subsequently through the transfer register 50, still in parallel by bit format and thus occupies corresponding stages in each of the seven shift registers of which transfer register 50 is composed. Hence, the seven serial shift registers define altogether *n* seven-stage, parallel character registers capable of serially shifting any seven-bit character from one end to the other.

The transfer register 50 can, therefore, be described as being comprised of *n* character registers, 7 stages each, and adapted to serially pass a character from one end to the other by *n*-shifting steps. It can be seen that it is principally immaterial whether the shifting from character register to character register within the transfer register 50 is carried out in a serial-by-bit or in a parallel-by-bit fomat.

The transfer register 50 feeds its output signals, i.e. the seven bits of a character which have passed through to a seven stage, parallel output register 60. During the record mode a seven line output switch 62 connects respectively the seven input lines or channels 23 for the seven record transducers 21 to the seven stages of the output register 60. During the reproduce mode, the register 60 is connected to input lines 12 of the computer.

The registers 40, 50 and 60 together constitute a buffer. Thus, data bits applied by the computer 10 to the output channels 11 (or by the read transducers to channels 24) will be shifted in parallel, first into the input register 40, then through the stages of the transfer register (serially or in parallel) 50 and then into the output register 60 to be applied in parallel to the record transducer 21 (or computer input channels 12). It is thus apparent that such data are in effect temporarily stored in the buffers 40, 50 and 60, whereby of course the maximum number of characters that can be stored at any given time is $n+2$. The size of this transfer register 50, i.e., the number $n$ is principally determined, on one hand, by the maximum output rate with which the computer 10 may at times furnish characters, and, on the other hand, by the rate with which data are withdrawn from the output register 60 for recording. In other words, the principal purpose of the buffer is to accommodate differences in the output rate of the data from the processor and the instantaneous rate of data recording. Analogously during reading, differences in the data read speed and in the data acceptance by the processor will influence the buffer size; the buffer size will have to be larger, the larger any such rate differences may be and the longer they are maintained.

In view of the employment of static type storage elements (flip-flop) it is possible to retain any character in this transfer register for any length of time. It should be mentioned that it is within the scope of the invention, though rare and of limited use, that the transfer register 50 may include no stages and can thus be dispensed with. This will be developed below by way of example.

One of the principal aspects of the present invention is the control of the shifting operations which differs for each of the three registers 40, 50 and 60. We continue to consider the record mode first. It is known, in general, that a computer will always provide a particular and identifiable output signal as a representation that the computer wishes to issue a character, or, to state it differently, that the computer output buffer holds a character and is thus ready to deliver this character to an external device, such as a magnetic tape unit for storage.

Line 13 is represent of such computer output clocking line, and whenever a signal appears in this line 13 seven bits may be drawn from the seven computer output channels 11. There is provided a switch 43 which is operated concurrently with the switches 42 and 62, and which in the record mode connects line 13 to the clocking input terminals of the flip-flops of register 40 so that the input register may be loaded with the seven bits then issued by the computer.

The transfer register 50, i.e., each of the 7 *xn* flip-flop stages are clocked by a signal drawn from a shift clock source 52, the signal being called SC. The frequency of this shift clock signal is at least somewhat larger than the maximum frequency of clock signals that may appear in line 13, the latter, of course, being the character rate of the computer output. If the transfer register is a serial-serial type register, this shift clock frequency must be at least seven times as large as the maximum character rate at the computer output. The source 52 may well be the fast computer clock itself with the frequency being in the megacycle range.

The output register 60 likewise receives the clocking signal SC for setting characters into the output register, permitting subsequent withdrawal therefrom. The specific mode of withdrawal will be described below.

For purposes of transferring data from the computer into the input register 40 and up to the point of setting the character finally into the output register 60, it is necessary to control such transfer of characters through the buffer 40, 50 and 60 in dependence upon the content of the registers. In other words, a character can be transferred from one parallel register to another one, including the *n* character registers of transfer register 50, only, if the respective succeeding register is not occupied by a character.

During recording, the computer 10 furnishes data at a fixed but possibly irregular rate, while data are called upon from the output register 60 at a rate that depends on the rate with which data are recorded on the tape which bears no relation to the computer operation. Accordingly, as the general case, there is an irregular flow of data from the computer into the input register 40 and an irregular output flow from the output register 60 into the recording transducer 21. Thus, one must control the traffic of characters through the buffer 40, 50, 60 to accommodate both.

For purposes of this control there are provided altogether $n+2$ status flip-flops respectively associated with the $n+2$ parallel registers of the buffer. There is a first status flip-flop 45 connected in that it is set during recording upon occurrence of a signal in line 13. In other words, the data clock signal for the input register 40 is applied to the set side input of status flip-flop 45. Flip-flop 45 may thus be a simple set-reset type flip-flop without clocking. Flip-flop 45 is reset by a shift clock signal SC, because after a character has been loaded into the input register 40, such character is transferred to the first parallel shift register of transfer register 50 by a clock signal SC. The input register 40 should always be emptied as fast as possible in order to render it capable of always accepting input signals from the computer 10.

Next, there is provided what is in effect an eighth serial shift register 55 defining $n$-status flip-flops, one each for the respectively parallel registers of transfer register 50. The set and reset states of all of the several flip-flops of shift register 55 merely indicate the extent the transfer register 50 is loaded and in which specific buffer locations there are characters. A character is traced through the buffer by a progressing setting of the status flip-flops with concurrent resetting of the status flip-flop associated with the parallel register out of which the character has just been transferred. The number of stages of register 55 that are set at any time is a numerical (digital) representation of the number of characters held in the transfer register 50 at that time. Any shifting of characters through register 50 does not change this number. How this is being used will be described below.

Finally there is an output register status flip-flop 65 which can be considered as extending the serial shift register 55. The serial register 55 and flip-flop 65 are, of course, clocked by the transfer clock signal SC in the same manner as the transfer register 50 and the output register 60.

As will be described more fully below, the status flip-flops serve to control the transfer of characters from the input of register 40 up to the setting of a character into output register 60. Specifically, any status flip-flop that is set blocks the input side of its respectively associated parallel character register. Accordingly, the status flip-flop organize the flow of characters to prevent any character from progressing faster than the characters held ahead of it permit it. The output register 60 is controlled by the status flip-flop 65. Status flip-flop 65 is reset when the character held in register 60 has been accepted by whatever device is connected to the output side of register 60. When status flip-flop 65 is reset, output register 60 can receive another character from transfer register 50.

A tachometer 32 is connected to capstan and motor and provides a pulse or wave train, the frequency of which is a faithful reproduction of the instantaneous tape speed, while the phase defines passage of similar increments of tape past the transducers. These increments define the bit spacing or b.p.i. rate. Specifically, during recording characters are recorded at that rate as determined by the passage of fixed increments of tape past the recording transducer so that the characters appear on the tape at a constant density. As a character is recorded at the time of such a pulse, this pulse train may serve as reset signal for status flip-flop 65, to signal that the output register 60 is ready to accept another character from transfer register 50.

Proceeding now to the description of the principal aspect of the present invention, the content of the status flip-flops 45, 55 and 65 are used to control the speed of the motor 30. One can see the following basic principle, which is particularly true during recording. Take any fixed time period T, the number of bits held in the buffer 40, 50 and 60 is equal to the number of characters fed during that period T from the computer to the input register 40 minus the number of characters withdrawn from the register 60 during the same period of time T plus the number of characters that were in the buffer at the beginning of the period of time T. As will be developed more fully below, this general rule can be used to develop a specific size for the buffer needed to accommodate specific known conditions and operational requirements.

It can readily be seen, that the number of characters in the buffer will increase (decrease), if the rate of data withdrawal is slower (faster) than the rate with which data are supplied by the computer. It is the principal purpose of the buffer to permit such rate differences, but it is quite apparent that such differences in the rate of data flow must be only temporary in nature and not permanent.

The density with which data are to be written on the tape is a preselected number, and primarily determined by the rate of pulses furnished by the tachometer 32, as stated. The rate of withdrawal of data from the output register 60 for purposes of recording same can be changed only if one changes the tape speed. The rate of character withdrawal will be large when the tape runs fast and the rate of withdrawal will be smaller the slower the tape runs. If at any given time during recording the data outflow from the processor 10 is higher (lower) than the instantaneous rate of data withdrawal or addition (recording), then the transfer register 50 will tend to fill up (deplete). Either case can be used to manipulate the tape speed so that the withdrawal rate is adjusted to the then prevailing data outflow of the computer. Accordingly, the number of characters held in the buffer 40, 50, 60 at any time is used to control the motor 30 in a manner that prevents overflow in the buffer.

It is apparent that the total number of status flip-flops set, i.e., the flip-flops 45, 65 and all of the status flip-flops 55 is an indication of the number of characters held in the buffer 40, 50 and 60 regardless which particular ones of the status flip-flop are set. This number does not change as a character passes through but remains in the buffer. This states the general case in that the flip-flops 45, 55 and 65 constitute a two directional counter, counting positively the number of characters passed into the buffer and subtracting therefrom the number of characters withdrawn.

The count number at any instant is set as digital input into a motor control circuit network 35 which includes a converter for converting this digital signal into an analog type signal. Specific aspects of this analog type signal will be discussed below. In general, however, the analog signal will be related to the digital input by a monotonic function, and it is used to directly control the motor. Motor 30 will thus be driven in relation to the number of characters held at any time in the transfer register; specifically the tape 30 will run faster if an increase of characters held in the transfer register indicates that more characters flow into it than are withdrawn. As the transfer register tends to empty, the motor may coast, be braked, or even come to a stop.

Regardless of the particular type of network used for digital-to-analog conversion, it is noteworthy that the motor control system is inherently provided with feedback: as stated above, the status flip-flops constitute a two-way counter, with the computer clock pulses in line 13 accompanying the character inflow of the buffer, being counted positively, while the withdrawal of data from the buffer is accompanied by tape speed dependent clock pulses resetting flip-flop 65 and thus sequentially subtracting from the count characters withdrawn from the buffer. Assuming a given rate of data outflow from the computer (inflow to the buffer) an equal rate of data outflow as to the buffer will cause the count number to be constant.

A change in rate of data outflow from the buffer will result from a change in motor speed. As this rate change in turn changes the buffer content, the motor speed will be changed. Hence, there is a feedback.

If $N_{in}$ is the total number of characters fed into the buffer, and $N_{out}$ is the total number of characters withdrawn from the buffer and N is the number of characters in the buffer, one finds as the general case:

$$\frac{dN_{in}}{dt}-\frac{dN_{out}}{dt}=\frac{dN}{dt}$$

Since $$\frac{dN_{out}}{dt}\cong v \text{ (motor speed)}$$

One finds $N=-(\text{factor})\cdot\int v dt+N_{in}$. This equation determines the current value for the buffer content number N. This number is now used to in turn control the tape speed $v$. It is preferred to cause acceleration of the tape as a specific number $N_1$ is exceeded while the tape is decelerated when N is below this or lower number.

The network 35 may include a digit rate meter, rendering the motor control dependant upon $dN/dt$ for reasons of stabilization and speedy response.

Proceeding now to the read or reproduce mode, the buffer is used likewise, and only the coupling or interpositioning thereof between computer and read transducer assembly 22 differ from the record mode. The read assembly 22 feeds its characters read serially and in parallel-by-bit relationship into the seven parallel output channels 24 and from there into the input register 40. Of course, for the read case it is necessary to place the switches 42, 43, 62 and 63 into the respective alternative positions. Switch 43 when in alternative position provides a different clocking signal for the input register 40. For this purpose there is provided a character gate control network 25 which in its simplest form is a so-called "or'd" clock, i.e., it simply detects the presence of any bit in the read transducers 22 regardless of channel to merely indicate the passage of a character under the read transducers. An indication such as "or'd" clock suffices for low bit densities.

The character-gate control network 35 may include some more elaborate circuitry in order to offset skew and intercharacter time displacement error (ITDE) and this will be given in more detail below. The output of the character gate network 25 furnishes the clocking signal for the read case to be applied to the input register 40 and of course to serve as setting signal for the input status flip-flop 45. The transfer register 50, the output register 60, as well as the status flip-flops 55 and 65 are clocked by the shift clock signals SC; this is the same for reading and for writing.

Switch 62 connects the signal output side of output register 60 to the seven parallel input channels 12 of the computer. For the read case the switch 63 connects the reset side of status flip-flop 65 to line 13, or if the computer so requires, to a difference line 13', but in any event to a computer output line which provides a signal whenever the computer has accepted a character from an external device, here from the output register 60. Upon resetting flip-flop 65, the output register 60 is thereby enabled again to accept another character from transfer register 50.

For the read case the motor control is somewhat different as will be apparent from the following considerations. In the read case characters are fed into the buffer 40, 50, 60 at a rate as they are read from the tape, and data are withdrawn from the buffer at the rate with which the computer demands the characters. The tape unit itself does not have control over this demand. Specifically, if the tape runs too fast, i.e., if the rate of data read from the tape is higher than the rate with which the computer demands data, the transfer register 50 will tend to fill up. Again this is symbolized by the number of status flip-flops set.

In the read case now it will be necessary to slow the motor 30 down when the buffer tends to fill up; slowing down of the motor means that less characters per time unit pass under the read transducer so that thereby the rate of data fed into the buffer is decreased. This includes the case that the motor be stopped as the computer ceases to demand any data, and when the buffer is full at the latest the tape must have come to a full stop.

For the reading case, the digital-to-analog converter in control unit 35 must provide a control signal which tends to increase the motor speed with a decreasing or low character filling state for the buffer, and vice versa. In other words, the correlation of buffer filling state and motor speed is inverse to the record case. This can be implemented in a simple manner, in that for the reading case the input, i.e., the digital input for the digital-to-analog conversion is not the number of status flip-flops set but the number of status flip-flops that are reset.

Figure 2:
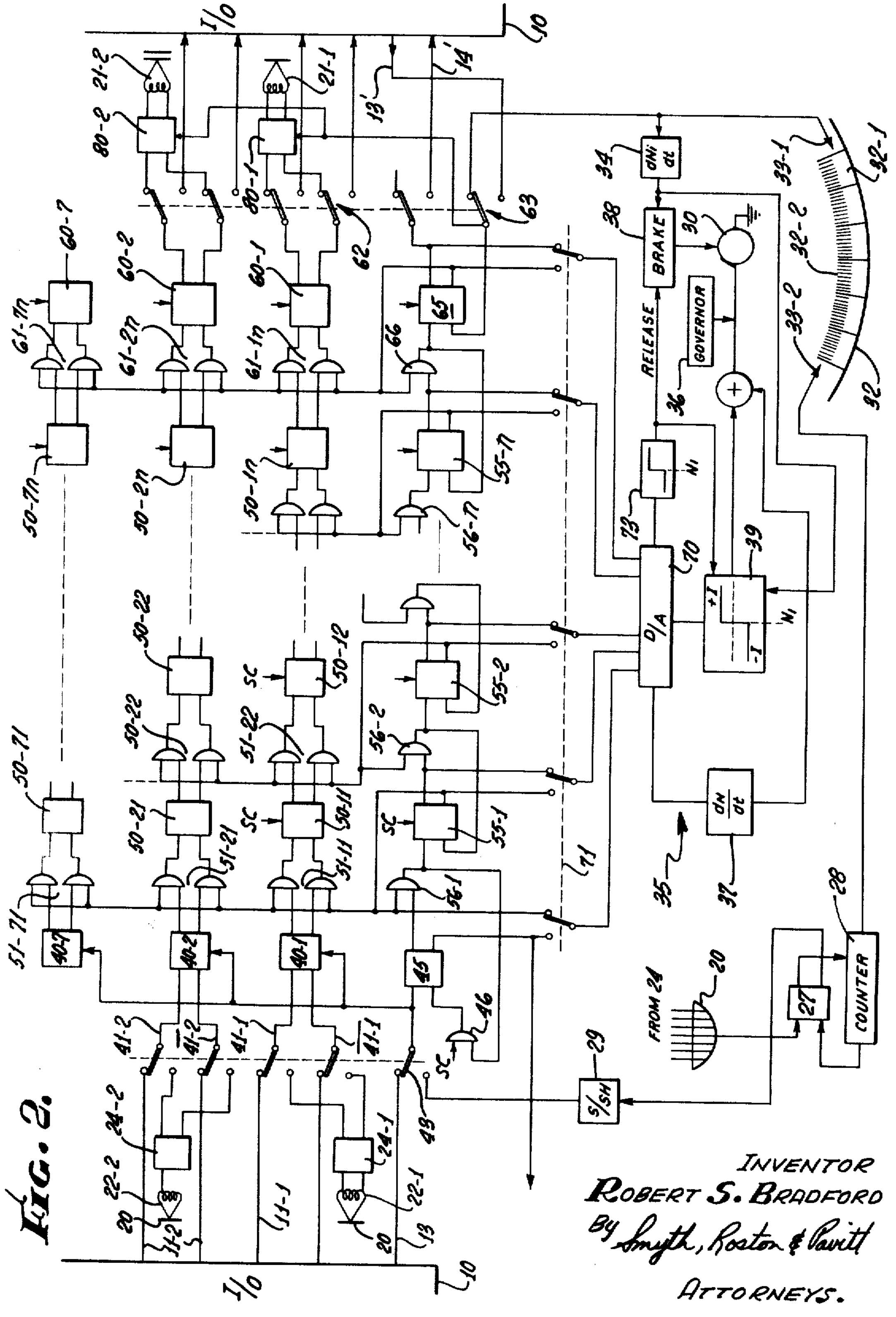
FIG. 2 illustrates a logic circuit diagram of a portion of a first example for the buffer and tape drive control as shown in FIG. 1.

After having described the general layout of the system that is the subject of the present invention, a more detailed discussion of the circuitry for the preferred embodiment and of specific aspects of cooperation between the several stages and components will now follow, and particular reference is made to FIGURE 2. The recording mode is taken up first. There are shown three of the seven computer output channels, 11–1, 11–2 and 11–7, and in the recording mode the switch 42 respectively connects them to set and reset input sides of flip-flops 40–1, 40–2 . . . 40–7 pertaining to the seven stage parallel input register 40.

The flip-flops 40–1, 40–2 . . . 40–7 in FIGURE 2 are of the conventional clocked and gated input type, so that for the recording mode of switch 43 connects the clocking input terminals of the flip-flops to receive the output of the computer clock fed to the line 13 as outlined above. Set and reset input lines of flip-flop 40–1 are respectively denoted 41–1 and $\overline{\mathbf{41{-}1}}$ to indicate that they receive true signals if a "one" bit or a "zero" bit is to be set into flip-flop 40–1. Lines 41–2 and $\overline{\mathbf{41{-}2}}$ control analogously the setting of a bit into flip-flop 40–2.

A pulse in line 13 indicates readiness of the computer to issue a seven bit character in parallel format. The input register 40 is associated with the status flip-flop 45, and the clock signal from the computer outline line 13 serves as input setting signal. The reset output side of the status flip-flop 45 is used to feed back a status signal to a computer input line 14. This status signal is false, when flip-flop 45 is set thus indicating that the input register 40 is not ready to receive another character but still holds the previous one. When flip-flop 45 is reset, this status signal in line 14 turns true as an indication that the input register 40 is now capable of receiving another character. Also, when the signal in line 14 turns false, this serves as an indication that the input register has accepted the character.

It is not necessary to control the input side of register 40 by the status flip-flop, because the computer will not furnish a clocking signal into line 13 as long as a character is still held in register 40 as indicated by a false signal in line 14. If the computer is not endowed with this particular capability, then the reset output side of status flip-flop 45 must be used to control gating inputs of register 40 in a manner analogous to the control of the transfer register flip-flops by their status flip-flops which will be described below.

Before describing the control circuit for resetting of status flip-flop 45, the transfer of a character from the input register 40 to the transfer register 50 will be described first. In the preferred embodiment, transfer register 50 comprises seven shift registers, each having $n$-stages. The serial shift register comprised of flip-flops **50–11, 50–12 . . . 50–1*n* receives the bits of the several characters for the respective first bit position. In other words, all bits passing through this first serial shift register of transfer register 50 will be recorded along one track. The first flip-flop thereof, 50–11 is connected to the output side of the input register stage 40–1**.

There is a corresponding second serial shift register denoted with reference numbers **50–21, 50–22 . . . 50–2*n*, and the first input stage thereof, flip-flop 50–21, is connected to the output side of input register stage 40–2** to receive all bits to be recorded on a second track. The other stages of the shift registers are connected accordingly and do not require further illustration.

Corresponding stages of the serial shift registers form parallel character registers, each one provided to accept all the bits of one character. For example, the first stages of the seven shift registers are denoted with reference numerals 50–11, 50–21 . . . 50–71. These seven flip-flops form the first parallel register of transfer register 50. The second stages 50–21, 50–22, etc. of all the seven serial register form a second parallel character register capable of holding the bits of one character particularly after the removal of such character from the first parallel character register 50–11, 50–21 . . . 50–71. The bits of any character will ultimately be set into the last parallel register of the transfer register, 50–1*n*, 50–2*n* . . . 50–7*n*. The flip-flops of the transfer register are clocked from the shift clock 52 having a frequency higher than the frequency of the computer clock in line 13.

Whether or not any of these parallel registers holds a character is indicated by a status flip-flop, and there are thus provided the *n* status flip-flops 55–1, 55–2 . . . 55-*n*. The flip-flop 55–1 is connected to be energized upon transfer of any character from the input register 40, which means that it is connected in a serial shift register fashion to the status flip-flop 45. In particular, the output set side of flip-flop 45 connects to one input terminal of agate 56–1, governing the input set side of flip-flop 55–1. The second input terminal of gate 56–1 is connected to the reset output side of flip-flop 55–1, permitting setting of the flip-flop only when reset.

The principal function of flip-flop 55–1 is to control input gates 51–11, 51–21 . . . 51–71 governing the individual bit transfer from register 40 to set and reset input sides of all flip-flops 50–11, 50–21 . . . 50–71, which constitute the first parallel register of transfer register 50. This gating signal is drawn from the reset output side of the flip-flop 55–1, and when false it denotes that a character is held in flip-flops 50–11, 50–12, etc. This gating signal when true indicates that a character can be transferred from the input register 40 to this first parallel input stage of transfer register 50, because any character previously held in the first input stage of transfer register 50 has been transferred into the interior of register 50 when flip-flop 55–1 is reset.

Conversely, of course, flip-flop 55–1 itself, can be set only when there is a character in input register 40 which can be transferred. Presence of a character in register 40 is indicated by a set-state of its status flip-flop 45. Thus, in the idle state, flip-flops 45 and 55–1 will both be reset and the gates 51–11, etc. are blocked because a false signal is provided by gate 56–1. As soon as a character is clocked into register 40, flip-flop 45 is set, and those of the flip-flops 40–1, 40–2, etc. receiving "one" bits will be set likewise. The true signal now provided by gate 56–1 indicates (1) that a character is in register 40, and (2) that the first parallel register (50–11, 50–12, etc.) of transfer register 50 can receive a character.

At the next shift clock pulse SC, this character is transferred into these first stages of register 50. Concurrently, flip-flop 45 is reset indicating that the character has been transferred into the buffer indeed. Specifically, a gate 46 responds to the set command signal from gate 56–1 accompanying the character transfer, and to the same SC-clock pulse, that sets the character into this first parallel register of transfer register 50.

As soon as a character is held in flip-flops 50–11, 50–21 . . . 50–71, the respective output gates 51–12, 51–22, etc., thereof monitor the state of the second status flip-flop 55–2 for transfer register 50. When flip-flop 55–2 is reset, the gates 51–12, 51–22, etc., apply the character bits held in flip-flops 50–11, 50–21, . . . , 50–71 respectively to the second parallel register of transfer register 50, composed of flip-flops 50–12, 50–22, etc.

A gate 56–2 controls the setting of status flip-flops 55–2 and it has one input terminal connected to the set side output of flip-flop 55–1 and a second input terminal receives the reset output side of flip-flop 55–2, which means again that flip-flop 55–2 can be set only if the first parallel register of transfer register holds a character, and if flip-flop 55–2 itself is reset indicating that the second parallel register is empty. Assuming that flip-flop 55–2 is in the reset state, then at the next clock shift pulse SC the character held in flip-flops 50–11, 50–21 . . . 50-71, will be set into flip-flops 50–12, 50–22 . . . 50–72.

Additionally, the signal drawn from the gate 56–2 for setting flip-flop 55–2 is used to reset flip-flop 55–1 at the same shift pulse SC that puts the character into flip-flops 50–12, 50–22 . . . 50–72. It is not necessary that the content of the flip-flops 50–11, 50–21, itself, etc. be changed by this transfer, since it is immaterial whether they still hold the character just transferred. It is important only that after such transfer has been completed the accompanying status flip-flop, here 55–1, is reset to open up the input gates 51–11, 51–21, etc. for flip-flops 50–11, 50–21, etc. respectively, and thus permitting another character transfer from the input register 40 to this first parallel register of transfer register 50.

The character transfer through transfer register 50 is thus readily apparent; particularly any character will pass through the several parallel registers of the transfer register 50 at the maximum rate determined by the clock pulses SC provided that the respective succeeding parallel register is in a state which permits acceptance of a character. At full capacity, the maximum transfer rate is half the frequency of pulse SC, because each status flip-flop can change its state only at clock pulse rate, and each character is held in any parallel register for at least one clock pulse period. Thus, each parallel register can accept only characters at most at every other clock pulse SC.

A character is thus being shifted to the end stages composed of flip-flops 50–1*n*, 50–2*n*, to 50–7*n*, and whether or not they hold a character is identified by the state of status flip-flop 55–*n*. In view of the relative high frequency of the SC shift clock, any character is relatively fast transferred from the input register 40 up towards the end of transfer register 50. In the normal case, there will always be a character in this last register stage of transfer register 50.

The output sides of flip-flops 50–1, 50–2*n* . . . 50–7 are respectively connected to the input sides of the output register 60, the stages of which being denoted with reference numbers 60–1, 60–2 . . . 60–7; the connections being respectively governed by gates 61–*n*, 61–2*n* . . . 61–7*n*. The output register 60 is associated with the status flip-flop 65 to control its capability of accepting a character. Flip-flop 65 has its reset output side connected to the input gates 61–1*n*, etc. and the same signal connects to an input gate 66 of flip-flop 65 with which the output of the status flip-flop 55*n* is monitored.

The flip-flops of output register 60 control write control flip-flops 80–1, 80–2, etc. Each circuit network 80–1, 80–2 . . . may include suitable amplifiers for respectively controlling the seven record transducers 21–1, 21–2. . . . The write flip-flops 80–1, 80–2, etc. may be of the clocked, single gated input type, having their single signal input respectively connected to the reset output sides of output register flip-flops 60–1, 60–2, etc. provided switch 62 is in the illustrated position. The connection between output register and write flip-flops depends on the type of recording used. The instant connection provides for a NRZ1 method, whereby the write flip-flops respectively retain their states for "zero" bits while changing for "one" bits at clock signals. The clock signals are the same as the signal that resets status flip-flop 65 in the record mode. The reset input side of flip-flop 65 responds to whatever clock signal source the switch 63 connects. In the record case presently considered, this signal source is a transducer 33–1. The resetting of the status flip-flops 65 for the output register 60 thus differs from the resetting of the other status flip-flops as aforedescribed.

In order to record at a constant bit density on magnetic tape 20, a digital tape pulse is being developed and derived from a tachometer 32. This tachometer 32 may be comprised of a disk bearing contrast or contact producing markers such as 32–1 arranged along the circumference of the disk. Disk 32 rotates in fixed synchronism with the capstan that drives the tape. The markers 32–1 pass the stationary scanning head 33–1 during this rotation and thus produce clock pulses. These pulses define instances at which the bits of a character have to be placed (recorded) on the tape 20. As the markers 32–1 on the disk are accurately positioned, the pulses indicate the passage of fixed increments of tape past any stationary point, provided the tape is substantially slippage-free coupled to the capstan.

The pulse frequency will vary with the tape speed. Thus, the pulses define speed independent of instances for recording bits on the tape, and if the bits are recorded whenever such clock pulse occurs, the bit density will be constant indeed. A pulse shaping network may be connected to the transducer or marker pick-off device 33–1. These tape speed dependent clock pulses, metering speed independently of the passage of fixed increments of tape, are now fed during the record mode as clocking signals to the record control flip-flops 80–1, 80–2, etc. The bits are recorded on the tape as defined in terms of occurrence or non-occurrence of work flip-flop state changes. However, it should be mentioned that the specific circuitry for controlling the recording flip-flops 80–1, 80–2, is immaterial; it depends on the recording method used and the clock pulses from transducer or pick-off 31–1 are principally destined to control the placement of the bit defining magnetization changes on the tape. The same phasing signal from transducer 33–1 is applied to the status flip-flop 65 for turning it off, if it was on. Thereupon another character may pass from the last parallel register of transfer register 50 into the output register 60.

It is thus apparent that a character, which has been issued by the computer is first sent into the register 40, provided register 40 is ready for the acceptance of such a character. Subsequently, such a character is shifted through the transfer register 50 as fast as the register stages ahead are emptied, until the character has reached the last parallel register of the transfer register 50. The emptying of the buffer depends on the rate at which characters can be withdrawn from the output register 60, and this in turn depends on the clock pulse rate as produced by the tachometer disk track 32–1. This rate is irregular for the general case and, of course, depends on the instantaneous speed of capstan motor 30.

In order to provide speed control in accordance with the invention there is provided a switch 71 which during the record mode connects all the set side outputs of flip-flops 45, 55–1 through **55–*n* and 65 to a digital-to-analog converter 70, which is part of the motor control unit 35. The configuration of this particular digital-to-analog converter 70**, i.e., its digital input-analog output characteristics or the utilization thereof depends entirely on the demands made on the transport. This requires some detailed discussion.

The system in accordance with the present invention is to accommodate primarily the following situations: It is basically unknown to what extent the computer desires to furnish data. Output data as derivable from the input/output network of computer 10 may pass into the seven output channels infrequently and sporadically. It is inadvisable to set the tape drive into motion just for a single character to be recorded, particularly if such character or characters occur at a very low rate and irregularly. It is thus desirable to accumulate several of such characters in the buffer before it is begun to withdraw them.

The advantages of such a mode of operation is to be seen in that it is not required for the tape drive to have start/stop operating conditions causing the capstan to advance only for one character spacing of the tape at the desired b.p.i. rate. The buffer permits that a number ($N_1$) of characters be accumulated before a starting control is exerted upon the tape drive, and there will always be recorded more than one character in on recording step before the motor is stopped again.

The digital-to-analog converter 70 may thus operate upon a switch 73 having threshold characteristics, for example, a Schmitt trigger, suppressing the production of any output signal below the digital input number $N_1$ that is representative of a lower limit or minimum filling state of the buffer before the motor 30 is being started. Once this minimum number $N_1$ has been reached the trigger or switch 73 releases a brake 38 for motor 30 and it further enables a constant current control network 39. The D/A converter 70 provides its output also to network 39 furnishing a constant current +I for input signals representing buffer content numbers in excess of $N_1$. The current +1 is fed to a summing point and the motor 30 will start up, preferably at a high rate, at least a rate sufficient to advance the tape 20 to obtain some recording. Recording proper proceeds now strictly in synchronism with the pulses produced by the pickup device 33–1 in response to the passage of markers 32–1 of the tachometer disk 32.

If the rate with which the computer furnishes data is still very low, it may well be possible that soon the buffer will again attain a filling state wherein $N<N_1$ so that the output of analog converter 70 is insufficient to overcome the threshold characteristics of threshold switch 73 which causes the motor 30 to coast to a stop.

The brake 38 which was released and remains released by operation of switch 73 may be triggered from a tape speed metering device 34, which conveniently may be a stage metering the number of tach pulses (output of 33–1) per unit time, which is proportionate to the tape speed. As the tape speed falls below a predetermined level, the brake 38 is triggered which means that the connection between tape speed metering and brake trigger must have threshold characteristics. The release signal from switch 73 can override the brake trigger. It thus appears that if the number of characters in the buffer falls below $N_1$, the brake release is disabled and at sufficiently low tape speed the brake will stop the tape.

In order to permit deceleration, network 39 can apply a negative constant current I to motor 30. It will also do so when the number of characters in the buffer falls below $N_1$. As in this case switch 73 removes its enabling signal, a tape speed responsive signal from metering device 34 will be used to continue enabling of network 39 as deceleration is required only when the tape has some speed. Conveniently, the enabling signal used may be the complementary signal that triggers the brake 38. But the specific motor characteristics may make it desirable to operate, i.e., trigger the brake and to disable network 39 at different tape speed values.

The aforedescribed circuit is destined to accommodate the system to the following situation. It may be assumed that the computer suddenly desired to furnish a large plurality of characters at the fastest rate possible or at an inherently given high rate. In this situation it will be necessary to record as fast as possible, and more particularly, to begin recording as fast as possible. It is apparent that the rate with which data can be withdrawn from the computer is determined by the desired b.p.i. rate times the maximum speed of the tape for recording. The rate with which the computer furnishes characters for recording may from the very beginning be that rate value. It is also apparent that for a period of time commencing at an instant at which the tape is addressed, this character withdrawal and recording rate cannot possibly be attained because the tape has to be scheduled.

The asynchronous method here employed permits instantaneous beginning of recording, but during the motor acceleration period the recording will necessarily be slower than during stationary operating conditions at maximum speed. In such a situation the buffer will at first fill up at a rate very close to the rate with which the computer provides the data, and only very few data will be withdrawn. Moreover, at the time of the sudden commencement of data flow the buffer may hold considerably less than $N_1$ characters, so that the motor may not even start at first. This rapid filling of the buffer, however, is very useful, because it reflects in a rapid increase in the output of D/A converter 70. For monitoring this situation there is provided a differentiating stage 37 which is part of the motor control circuit and which will respond to such a sudden increase in the number of status flip-flops set. The differentiating stage 37 is now adjusted to provide the maximum current I to the summing point causing motor 30 to start up at the fastest rate possible. The output of stage 37 must also release the brake 38.

As the buffer content number passes the threshold value $N_1$, switch 73 will respond and control is now turned over to network 39. Soon data will be withdrawn from the output register 60, so that the sudden increase of the character content in the buffer is being reduced but rather slowly at first. As long as the buffer has a filling state in excess of $N_1$ rapid acceleration continues. Soon motor 30 will attain high speed.

The motor control may well be devised in that the speed approached but not instantly attained by the motor 30 is in excess of the normal motor and tape speed. Normal tape speed is here understood to means the speed at which the data withdrawal rate for recording equals the rate with which the computer supplies data. A governor 36 will limit the speed to a maximum value which is preferably not much above normal tape speed in order to facilitate stabilization. Any tape speed in excess of normal tape speed will cause the withdrawal rate to be higher than the supply rate so that the buffer content reduces. As the number N now falls below $N_1$ network 39 will cause deceleration. Stable conditions will have been reached, when the rate with which data are passed by the computer into the input register 40 is on the average now equal to the rate with which data are withdrawn from the output register 60. On the other hand, stable conditions are not essential for the invention as long as the oscillations of the motor speed do not exceed critical limits.

At stable operation, the buffer will hold approximately $N_1$ characters. As the computer ceases to furnish data, the buffer will suddenly tend to deplete, causing network 39 to apply deceleration current to motor 30. However, stopping is not instantaneously and withdrawal of the data from the transfer register will continue indeed. The number $N_1$ on one hand, and the characteristics on the other hand must be selected so that the motor will stop at the latest when the transfer register is empty. The reason for this is to be seen in that it is advisable to never have any tape movement as long as there are no data in the buffer. The possibility that the tape is advanced but there are no data available for recording must be avoided; irregular spacing is undesirable. To state it differently, a situation must be avoided in which a pulse is produced by pickup device 33–1 with no data to be clocked out of the output register 60.

It is apparent that the start characteristics of the motor 30 have a great influence on the size and capacity of the buffer. A brief and simple calculation reveals the following: assume a situation of a fast outflow of data from the computer and assume further that the circuit tends to accelerate the motor from zero to full speed during a period T. Assume further that the rate at which data is set into the input register is at no time restricted by the possibility that the buffer is already full, and assume finally that this rate is from the very beginning equal to the data flow rate of stationary recording conditions. The final data and flow rate of the buffer will be the b.p.i. density rate times the maximum or nominal tape speed at stable conditions. The initial outflow rate of the buffer is zero. The buffer size necessary to accommodate this situation is the final outflow rate reduced by the average rate with which data can be withdrawn from the output register 60 during the acceleration period. This arithmetic difference multiplied by the acceleration time T gives the number or characters to be accommodated by the buffer during the acceleration period provided there is no overflow condition.

Assuming we have a 1 kc. recording rate as the rate of data flow, a maximum tape speed of 1.25 i.p.s., a bit density of 800 b.p.i., and assuming an acceleration time of 20 milliseconds, then we attain a value for the buffer enabling it to hold at least 10 characters. This number is in excess of the number of characters held in the buffer in the idle state if it is desired that the buffer is never to be completely depleted.

However, it must be considered additionally that during normal tape speed the buffer holds $N_1$ characters and that deceleration commences at that point whereby the tape must stop before the buffer is empty, so that $N_1$ must also be at least 10 if one reasonably assumes that acceleration and deceleration periods are approximately equal for the change in tape speed from zero to normal and from normal to zero, respectively. How much more than $N_1$ stages are needed will result from the read case (infra).

It is, of course, apparent that for a higher b.p.i. rate and/or for a higher tape speed as design features, the number of stages in the buffer must be increased accordingly; on the other hand, a reduction of acceleration time permits a reduction in the number of stages. The number of flip-flop stages in the buffer is, from a technical standpoint immaterial, but due to cost considerations this buffer is, of course, to be kept as small as possible. Since usually the tape speed and b.p.i. rate are fixed parameters, there is only one variable left, which is the acceleration time for the motor, and its control circuit should thus be made highly sensitive to permit a very high acceleration rate.

A different situation exists if due to specific format requirements it becomes necessary to provide for so-called inter-record gaps, i.e., data gaps, on the tape which do not contain any data while still each record has a fixed bit-per-inch density. The reason behind the provision of such inter-record gaps is the requirement that a record conventionally will be read at a constant speed and in one continuous operating stop; then the conventional tape drive is to be stopped and from the stop position, the tape must be started again with reading of the next record not to commence until the tape has gained full or rated speed.

The asynchronous read-record method suggested here does not need such inter-record gap. The sole purpose of such inter-record gaps is to permit a tape machine, in general, to stop and to start again in between records so that reading proper is had only at a relatively high and constant speed. Nevertheless, provisions of interrecord gaps on any tape permits exchangeability of tape reading units, and particularly tapes recorded with the present unit are rendered readable by conventional tape reproducing units requiring such gap. The provision of an interrecord gap requires tape transporting over a predetermined distance without recording. As was outlined above, the tape drive when controlled from network 70 will tend to stop, when the processor ceases to issue data, and full stop occurs as soon as the buffer is almost depleted, but a few characters will still be in the buffer, not having been recorded yet. A tape drive signal may have to be developed now overriding the tape motion control from network 70.

There are different ways of controlling this "gap recording" procedure, and the specific way selected will largely depend on the extent of processor participation. In other words, for gap record it must be considered whether the processor meters the interrecord gap or whether the tape drive system must provide for the gap metering. For example, if the processor meters the gap by issuing a predetermined amount of "blind" characters (for example, characters having only "zero" bits or "one" bits) then nothing is changed, as such "characters" may be recorded and handled by the buffer by the status flip-flops, and by network 70 as normal characters, and the unit described above will operate without requiring any change in the system design.

Figure 6:
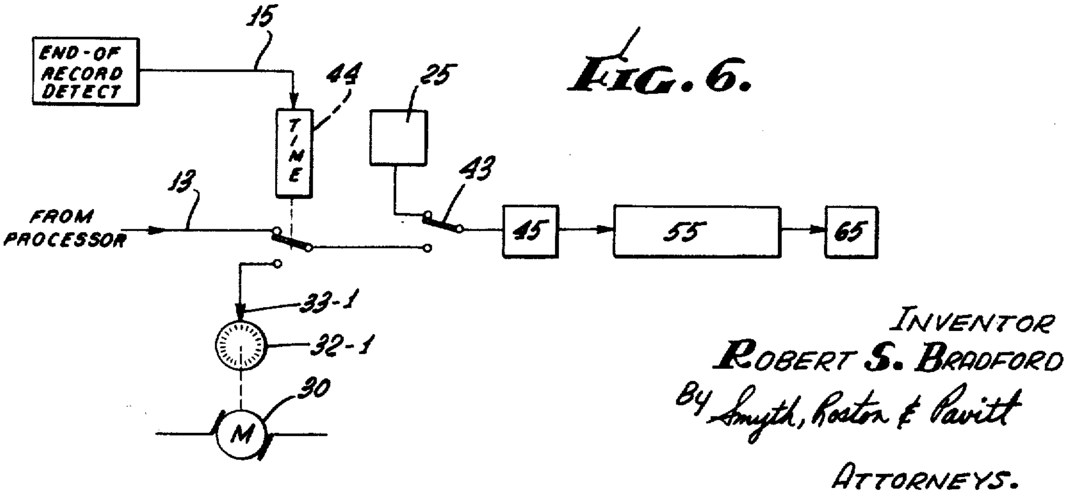
FIG. 6 illustrates a supplementary circuit for data gap control applicable to any of the circuits in FIGS. 1 to 5.

This mode, however, imposes an additional burden on the processor and may thus not be desirable for all cases. A simple gap recording control is shown in FIGURE 6. This circuit depends solely on the proposition that as the processor issues the last character of a record, a special control signal can be derived from the processor, directly or indirectly; this special control signal may, for example, be a decoded end-of-record code, stimulating an externally accessible line 15 for closing a time switch 44. This time switch meters a predetermined period of time at a degree of accuracy as is required for the interrecord gap, which is generally less than the b.p.i. accuracy.

For the duration of time switch response, the transducer 33–1 is disconnected from the reset side of flip-flop 65 and is connected instead to the set side input of flip-flop 45. As this will occur when the tape is still running, tach-pulses will be introduced into the status flip-flops to stimulate inflow of characters. They are being passed at first into the buffer but not recorded for the duration of time switch response so that the buffer is full during recordation of "gap." Accordingly, the tape will traverse the distance that is to be the gap at maximum speed, so that the delay time of switch 44 is the ratio of the desired gap length over the maximum speed.

When the time switch 44 releases its contact, normal operating conditions for recording are restored. If new characters are not furnished by the processor, the buffer will be emptied quickly causing the tape drive to come to a stop. The tape will come to a stop with some blind or simulated characters still in the buffer. When the processor starts to issue characters, the system will first record these left over "zeros" and then the data proper are recorded. This way, the tape is still consistently controlled by the buffer content, and the accuracy of the gap depends solely on the accuracy of the time switch. It may be desirable not to use the output of transducer 33–1 for gap control, but the fast clock pulses SC.

In case the interrecord gap must be metered very accurately, i.e., with an accuracy determined by the bit density of a record, a pulse counter can be used for counting, for example, the tach-pulses drawn from the track 32–1. Alternatively, there may be a third track or disk 32, having only a few or even one marker, which are counted to meter the gap by causing switch 44 to stay closed for the thus metered distance. The gap metering accuracy will then result from a compromise in the number of such counting stages and the density of markers on the third track.

Figure 3:
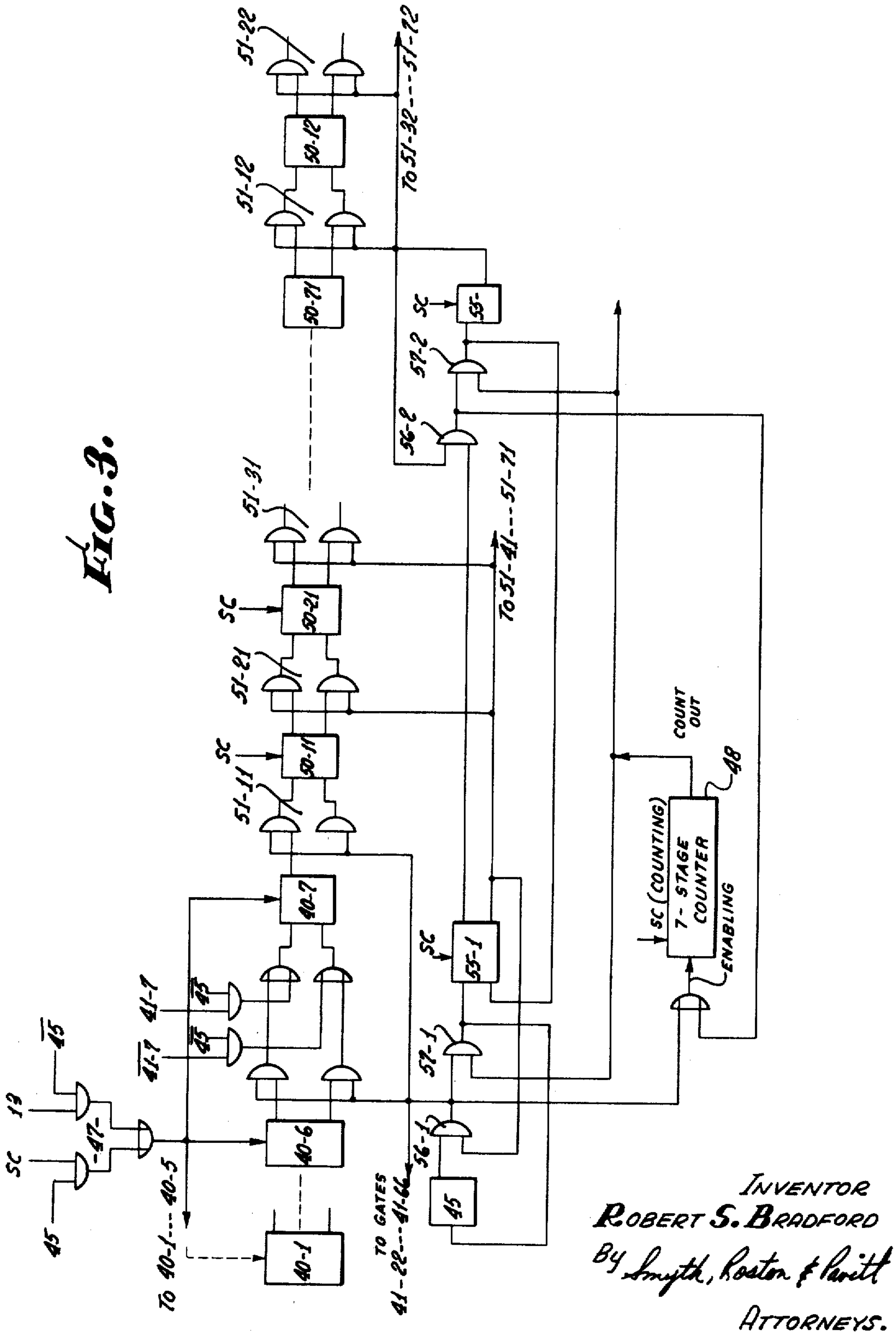
FIG. 3 illustrates a modified logic circuit for the buffer.

FIGURE 3 illustrates representatively a modification in the circuit network to be used in case the transfer register operates in the serial-by-bit and character mode. First of all, the input register must be adapted to receive the bits of a character in parallel while passing them on serially. In this case, "or" gates are connected to the individual input terminals of the flip-flops 40–1 . . . 40–7 in FIGURE 3, for connection to the signal line 41. Representative there are shown lines 41–7 and $\overline{\mathbf{41\text{–}7}}$ for respectively feeding a "one" or a "zero" bit signal to set or reset input sides of flip-flop 40–7. There are analogous input lines for flip-flops 40–1 to 40–6, whereby all these lines require an enabling signal $\overline{\mathbf{45}}$ to prevent overlapping of the different shifting modes of input register 40.

The clocking of the flip-flops of input register 40 is governed by a gate assembly 47, permitting parallel input shifting with signals from the clock line 13 when status flip-flop 45 is reset (signal $\overline{\mathbf{45}}$). Alternatively, when flip-flop 45 is set, the shift clock signals SC can be used to trigger the input register flip-flops for serial shifting. A character that has been loaded in parallel into the input register 40 will then be shifted serially out of it and into the first character register of the transfer register, which are the stages 50–11, 50–21 . . . 50–71. This serial shifting must not commence until status flip-flops 45 is set, while status flip-flop 55–1 must be reset to permit this shifting. This circumstance is monitored by the gate 56–1 as before. The output signal of 56–1 serves now as gating signals for serial shift gates 41–22 . . . 41–66 and 41–77, interconnecting the several stages of the input register 40 to form a serial shift register. There are no serial shifting control gates 41–11, as the input of flip-flop 40–11 does not participate in the serial shifting. The gates 41–77 serve as representative example for interconnecting flip-flops 40–6 and 40–7 in this fashion. Additionally, input gates 51–11 for stage 50–11 are gated open by this output signal of gate 56–1 to link the two registers.

Two points are important. The status of flip-flops 45 and 55–1 should not be changed as shifting commences but only after the seven bits have been shifted seven times to occupy the proper positions in register 50–11, 50–21 . . . 50–71. Hence the output signal of gate 56–1 is not used (as was in the embodiment of FIG. 2) directly to change the status flip-flop but to enable a counter 48 to count pulses SC, up to "7." The completion of this count-to-seven operation is monitored by a gate 57–1 providing the reset signal for status flip-flop 45 and a set signal for status flip-flop 55–1. Subsequently, further serial shifting is inhibited and the input register 40 is ready to receive another character, now again in parallel. As status flip-flop 55–1 turns on, gates 56–2 monitors whether flip-flop 55–2 is off. If so, all gates 51–21 . . . 57–71, 51–12, 51–22 . . . 51–72 receive gating signals to serially shift the character again in seven steps, into the second character register. Linking gate 51–11, of course, does not receive this gating signal from flip-flop 55–1. The completion of this seven-step shifting is again metered by counter 48, and its output controls a gate 57–2, opened by the true output of gate 56–2 to set status flip-flop 55–2. The counter 48 may be used for all transfers, and all characters in the buffer are shifted (if they can be shifted at all) concurrently. For this reason, enabling signals for the counter need to be drawn only from the output side of every other status flip-flop.

The output register 60 (not shown here) can be linked to the serial shift register configuration in an analogous manner. The status flip-flop 65 will be controlled as shown in FIGURE 2 with a counter responsive signal additionally governing the effectiveness of gate 66. Care must be taken, that the clocking pulses resetting flip-flop 65 (tachometer signals) do not occur during serial shifting. This is taken care of two-fold. First, the counting cycle of counter 48 will be at least twice as high as any possible pulse frequency in transducers 32–1, i.e., complete shifting must be faster than the recording frequency. Second, the buffer is never depleted, there always is thus a character in flip-flops **50–1*n*, 50–2*n* . . . 50–7*n***, so that after parallel withdrawal of a character from the flip-flops of the output register, as marked by a tachometer pulse, a new character is immediately shifted into the output register, and this shifting is terminated with certainty before the next clock pulse.

Figure 4:
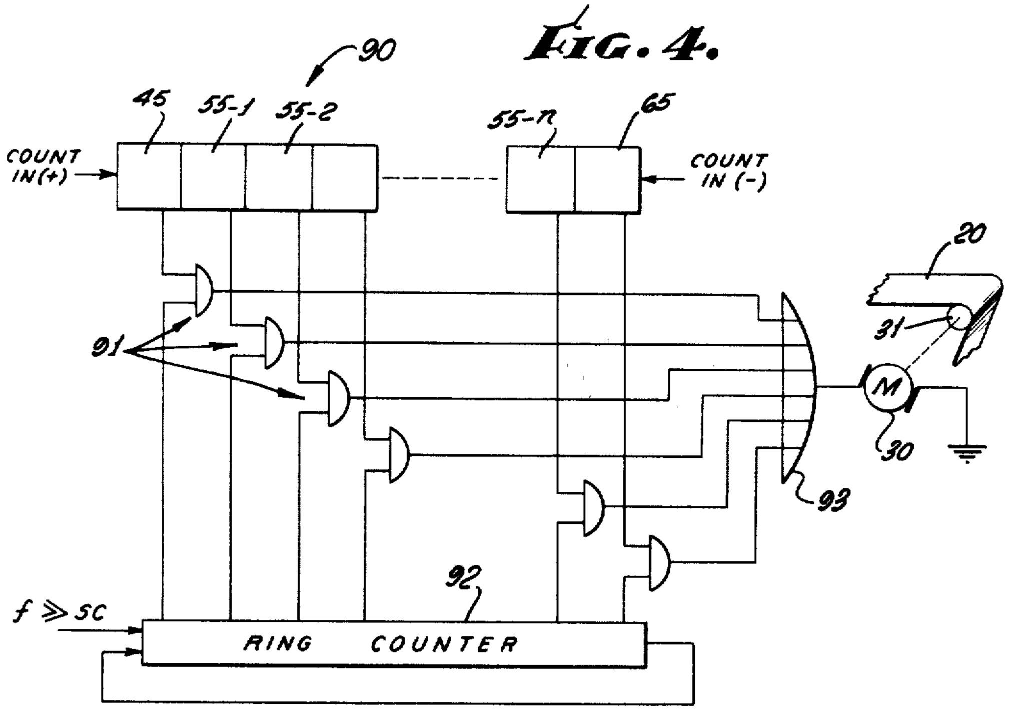
FIG. 4 illustrates a modification of the tape drive control applicable to any of the buffers.

A modified form of the motor control is shown in FIGURE 4. All of the status flip-flops are represented as a general shift counter 90 receiving adding and subtracting counting signals as aforedescribed. A gate assembly 91 permits sequential scanning of the status flip-flops-counting stages. These gates 91 are sequentially enabled by a ring counter 92 receiving counting pulses at a frequency *f* well in excess of the shift clock signal SC for the transfer register. If the transfer register operates strictly on a serial-by-bit format (FIGURE 3), the ring counter 92 may then be operated by the same bit shift clock, SC having a frequency that is higher at least by the factor seven than the character clock signals as derived from the output side of counter 48.

Figure 5:
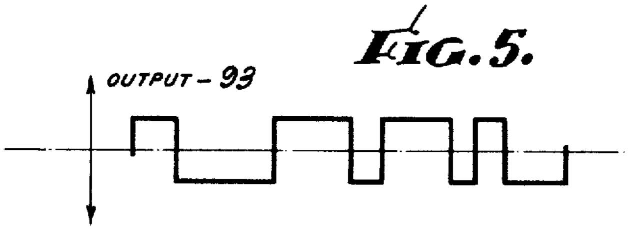
FIG. 5 illustrates a waveform diagram for the signal developed by the circuit shown in FIG. 4.

The output signal of the gates 91 are assembled by an "or"-type network 93 gating or waveform as shown in FIGURE 5. In this case, positive pulses result from the status flip-flops set, negative pulses from the status flip-flops reset. The amplitude values for the pulses may differ so that the average pulse amplitude value over one ring counter cycle is zero when $n$ flip-flops are set. This gives the minimum number of characters held in the buffer before the motor 30 is set into motion.

The foregoing embodiments were described with primary reference to the record mode. For the read-mode, reference again is made to FIGURE 2, but it will become apparent, that the modifications of FIGURES 3 and 4 operate in an analogous manner. From the description of FIGURE 1, it will be recalled, that the read case primarily concerns only a different connection of the buffer as a whole, and the principal differences rest on the signals "counted" by the status flip-flops.

FIGURE 2 illustrates two read transducers 22–1, 22–2 as representatives of the transducer head assembly 22.

The output of the read transducers 22–1 and 22–2 in FIGURE 2 respectively connect to a network 24–1 and 24–2 which may include amplifiers as well as readout flip-flops for specifically distinguishing between bit values 1 and 0 as read from tape 20. The switch 42 is then in the alternative position so that the output of networks 24–1, 24–2, etc. can be fed to the input sides of the input register flip-flops 40–1, 40–2, etc. Control of the tape in the read case differs from the motor control during recording, which aspect will be discussed in detail below and was briefly mentioned above. For the moment, it shall be assumed that the tape has been somehow set into motion, and that data are read out indeed. The input clocking for the flip-flop 40–1 differs from the record mode and for this we return to the tachometer disk 32.

It should not be forgotten that a character is provided to the record transducer for recording in a strict parallel, i.e., parallel-by-bit relationship. On the other hand, phenomena such as gap scatter, and skew are effective both during recording and during reproducing; summarized they produce the so-called interchannel time displacement error (ITDE) which is to be described as follows.

Assuming that for purposes of reference at any given time a character has been recorded having seven "one" (or "zero") bits in all of its bit positions, and that they have been provided for being recorded concurrently. Upon readout of that character these "one" bits will not occur concurrently, and the interchannel time displacement error is for that instant defined by the time that elapses from the occurrence of the first bit up to the time of the last bit of this particular reference character. The instantaneous value of the interchannel time displacement error follows a statistical distribution, and its absolute value for any given instant cannot possibly be known. However, one can estimate the maximum ITDE for a given system. The ITDE maximum value is a limiting factor in selecting character density on the tape, because the last bit of any particular character when read must never occur after the first bit of the next character has already appeared; otherwise, the characters would become indistinguishable; therefore the b.p.i. rate is limited by the ITDE.

The use of the word "time" in the ITDE definition is somewhat misleading, as the phenomena involved are strictly distances resulting from transducer head inaccuracies and tape tilting. However, these error-distances are effective in time by causing a delay between bits which should occur concurrently. The maximum ITDE of a given system can reasonably be defined in terms of a period of time value and as a delay between first and last bit of a character, only for a particular and constant tape speed. The maximum ITDE in terms of a distance is speed independent, but its effectiveness as bit-delay is speed dependent, fortunately, however, strictly in proportion to instantaneous tape speed.

For this reason disk 32 is provided with a second track 32–2 which in effect finely divides the character-spacing-defining-reference markers 32–1 at a constant rate, and having preferably a dividing rate higher by at least one order of magnitude. The pulse train occurring in a corresponding pickup device 33–2 whch monitors passage of these reference markers of track 32–2, has a frequency that is an integral multiple of the frequency of the pulse train in the pickup device 33–1. Either frequency is strictly proportional to the tape speed at any instant. For any tape speed, the interchannel time displacement error is effective as a time interval measured from the times between the first and the last bit of a character. Hence, in any case, when the maximum expected ITDE delay has elapsed as measured from the occurrence of the first bit of a character, all bits pertaining to that character must have been in.

As the ITDE (maximum) is actually a fixed distance value, the markers of track 32–1 can therefore be used to meter this distance. For example, at any given system the ITDE distance value may be equivalent to the passage of $m$ markers of track 32–1, i.e., when $m$ markers have passed at any given stationary point, the tape has moved by a distance that is equal to the ITDE distance value. By metering in time the occurrence of these $m$ markers at any tape speed, one finds the period of time during which all bits of character will occur with certainty. Thus, as a first character bit occurs, $m$ markers of the track 32–1 are counted subsequently, regardless how long it takes to complete this count. After counting $m$ markers one knows that the tape has moved by the ITDE distance value and one can say with certainty that all bits of this character must have passed the read transducer.

After these general considerations the reason for providing the following network will become immediately apparent. There is a logic "or" circuit 26 connected with its input terminals to all the output networks 24, and "or" circuit 26 detects the appearance of the first bit character. Gate 26 is thus what has been described above as "or'd" clock. For a simpler system without deskewing, the output of circuit 26 could be used directly as input clock for the input register. For deskewing, the output of gate 26 is used as follows. The first bit monitored by gate 26 is set into a flip-flop 27 for turning it on, and the flip-flop 27 when set enables a counter 28. The input side of flip-flop 28 as far as counting pulses is concerned, is connected to receive the output signals of transducer 33–1 which counts marker pulses from the track 32–1. The counter 28 is designed to count up to the count value $m$ defined above. Thereby counter meters the delay needed to compensate for ITDE at the prevailing tape speed at that time.

The counter output pulse is used twofold; it is used to turn flip-flop 27 off, and to trigger a single shot or monovibrator 29 furnishing a pulse of short duration which is used for input clocking input register 40 during the read mode. The output of monovibrator 29 is additionally fed to the input set side of the status flip-flop 45. Thus, the bits then held in the readout network is passed into the input register 40. The monovibrator output pulse marks the time in which all bits of a character are in.

The character thus loaded into the input register 40 is passed into and through the transfer register 50 in exactly the same manner as was described above for the recording case, whereby again the transfer of such a character is determined by the fast SC clock pulses.

Looking briefly to FIGURE 3, it can be seen that there is no difference in case of a serial-serial buffer. The clock for parallel input shifting into the register 40 is then the output of single shot 29 rather than the computer clock line 13, no further difference exists.

Proceeding now to the description of the output register in FIGURE 2, the switches 62 connect the output set sides of the flip-flops 60–1, 60–2, etc. to the input channels 12 which lead into the computer. In this case, again the output register 60 in FIGURE 2 and the associated status flip-flop 65 is reset from the computer clock signal in channel 13, signalling acceptance by the computer of character where upon the status flip-flop 65 can be reset, thus opening up the input gates for the output register to permit transfer of another character therefor.

For the read mode as presently described, switch 71 is in the alternative position thus applying the reset output sides of all the status flip-flops 45, 55–1 through 55–*n* and 65 to the digital-to-analog converter 70 (or in case of FIGURE 4, to the gates 92). This now means that if the buffer attains a filling state in excess of a predetermined number of characters then held, the digital-to-analog converter 70 input is reduced below the threshold value for which the motor 30 is being stopped. It is apparent that this situation will prevail if computer simply ceases to withdraw data from the output register 60. Now the buffer will tend to fill up, but before this can happen the motor 30 will be stopped. Stopping must occur at a time before the transfer register is completely filled. There should be a safety margin so that data may not be lost in that they cannot be passed into register 40.

One can see here now that there is a symmetrical relationship for read and write cases with similar threshold conditions. This means that the number $N_1$ must be equal to 50% Buffer Capacity. In the above example for a 1.25 i.p.s. normal tape speed, a b.p.i. rate of 800 and a stop/start characteristic of 20 ms. it was found that $N_1$ was at least 10. Thus, the total Buffer Capacity in this case will be 20 stages.

For the read case there now is the specific situation that data have been read already, but they have not yet been demanded by the computer. Assuming that after some time has elapsed, reading is to continue as signalled by the computer, the computer may simply start to withdraw the data from register 60. Flip-flop 65 may have its set side output connected to a special input channel 14′ of the computer to signal the availability of a character. As there always is a character in register 60, this signal is a continuous one and the computer can commence to withdraw instantly indeed.

Character withdrawal from the buffer at the tape standstill results in a depletion of the buffer, and networks 73 and 39 will respond to set the tape motor into motion. As the rate of withdrawal may be a rapid one, the differentiating stage 37 will respond so that motor 30 will be started promptly and data will be read from the tape as fast as possible to permit complete buffer depletion. The buffer will tend to refill itself and when a particular equilibrium has been reached, normal reading will proceed.

The tape may have a number of records separated along the tape by an interrecord gap, introduced above. This produces the following situation. After the read transducers have passed over the last character of a record, no characters are presented any more to be fed into the buffer, but withdrawal still continues. Such a depletion of the buffer is effective in the motor circuit as an accelerating signal. Particularly, the buffer capacity over the b.p.i. rate will be larger than the gap. In the example above, 20/800=1/40″, while an interrecord gap usually is ½″ or ¾″. Thus, the buffer will be completely depleted and the motor circuit receives this as an accelerating signal tending to increase the motor speed.

Motor will traverse the interrecord gap at maximum speed until the next record has been reached, causing reloading of the buffer. The buffer will now tend to fill up. If the computer continues to withdraw data normal reading is resumed; if, however, the computer has ceased to withdraw characters after it found an end-of-record character, then the tape drive will be stopped as soon as the critical limit $N_1$ has been reached. The drive is started again later on when the computer commences to withdraw from the buffer.

It is quite possible, however, that the computer does not desire to read that next record, but commands a rewinding of the tape, or a fast advance of the tape to a different position; here it might be desirous to disconnect the converter 70 from the control circuit of the motor 30, and the motor is then being connected to a rewind circuit and possibly the tape is advanced at a different speed towards the difference location; concurrently, it is necessary to erase the content of the buffer and to turn over the remote control to buffer after the first characters of the new record are in the buffer. The situation is similar in case of a changeover from the mode read to the record mode or vice-versa.

As these special situations are of no concern for the particulars of the invention, they are not considered here in detail. It is apparent to one skilled in the art how to disconnect the instant circuit from the motor for operating it in different control modes.

From the foregoing, it will be appreciated that there is a trade-off between the start-stop or acceleration-deceleration characteristics of the tape advance unit and the buffer capacity, particularly for maximum flow of data to and from the computer commencing at standstill conditions. It is permissible to reduce the buffer capacity if these maximum flows can be reduced accordingly. This includes the possibility of completely eliminating the transfer register 50 and of combining input and output registers 40 and 60 into a single unit. In such a case the output of the register 40 would then be directly connectable to the switches 61 for selective connection to the record control flip-flops 80–1, 80–2, etc. on the one hand and the computer input channel 12 on the other hand. The single status of flip-flop 45 would then be reset not in the way illustrated, but by the signal derivable from either one of the two input sides of switch 63.

Of course, the operation of the motor 30 will then necessarily be reduced to the single on-off switching operation, whereby in the record mode status flip-flop 45 will turn the motor 30 on for maximum acceleration, while withdrawal of the character causes the resetting of flip-flop 45, which in turn causes the motor to brake. Conversely, during the reproduce or read-mode motor 30 would be turned on when flip-flop 45 is reset, but stopped when flip-flop 45 is set. Of course, in this situation, the stages 37 and 70 and 73 would not be needed.

Figure 7:
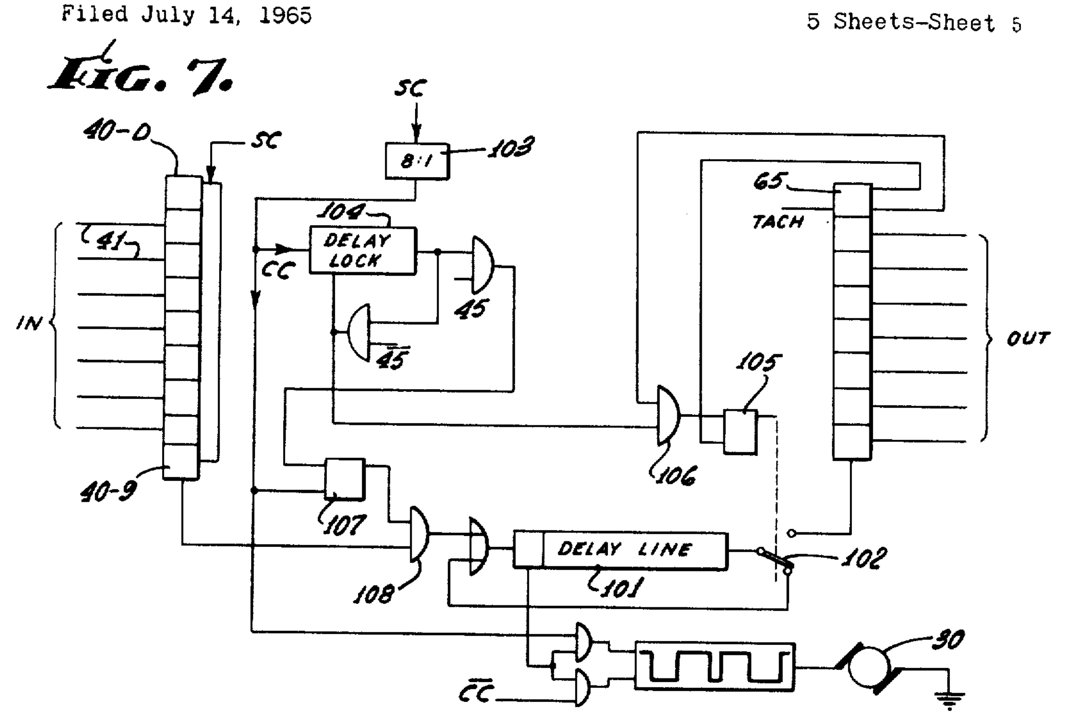
FIG. 7 illustrates somewhat schematically a block diagram for a data transfer system using a recirculating delay line.

In view of the foregoing description, the embodiment shown in FIGURE 7 requires only a brief explanation. Here, the input register 40 is again wired for parallel inputting and serial shifting for transfer as is shown in FIGURE 3. However, register 40 is enlarged by two stages 40–0 and 40–9 in FIGURE 7 at either end, but neither of the latter two stages are connected to receive any data in parallel. Stage 40–0 is a flip-flop or other suitable device that is permanently set to simulate a one bit. Hence, as a deviation from FIGURE 3 the first stage 40–1 has also a parallel shifting input control, to receive the one bit simulated by stage 40–0 and to pass such one bit to the succeeding stages. Stage 40–9 serves as temporary storage unit for such a one bit at the end of a serial shifting cycle, to be used as marker subsequently.

The transfer register here is comprised of a delay line 101 wired for recirculation provided a switch 102 is in the illustrated position. The switch is only a simplified representation for a selectively gated signal path. In the alternative position of the switch the delay line can discharge data bits into the output register 60, enlarged here by one stage, for which one can use the status flip-flop 65 of the output register. Register 60 is wired to receive data by serial shifting, and it permits parallel data withdrawal as aforedescribed.

Loading and unloading of characters into and out of the delay line 101 is controlled from a clocking arrangement having as principal input the shift clock SC. A frequency multiplier or pulse count down network 103 specifically responds to the clock pulses SC and divides their frequency to produce one character clock signal CC for every eight clock pulses SC. Additionally, there is a counter 104 which counts the signals CC up to the number of characters that can circulate in the delay line 101 when closed for recirculation. This counter 104 is started anew when the count result has been reached and when the flip-flop 45 is set.

Whenever the count result has been reached, a true signal 107′ is produced by a flip-flop 107. Flip-flop 107 is in the set state for a duration of eight clock pulses SC. Flip-flop 107 can be set only when status flip-flop 45 is set to indicate that a character is held in the input register 40. The true signal 107′ enables the serial shifting circuit for input register 40. Additionally, gating signal 107′ opens a gate 108. Status flip-flop 45 operates otherwise as afore-described, i.e., it is set as soon as a character is held in the input register 40; flip-flop 45 is reset after the character has been withdrawn from the input register. The end of true-signal 107′ concurs with or may cause resetting of flip-flop 45 (see FIGURE 3). The flip-flop 107 will be reset at the next pulse CC following the reaching of the counting result by counter 104. This set-state period of flip-flop 107 thus meters the eight SC pulses for serially shifting a character into open gate 108. A flip-flop 107 is reset so that a new circulation period of the recirculating delay line begins, to concur with the resetting of counter 104. Resetting of counter 104 marks a new delay line recirculating period. This specific instant depends on the state of flip-flop 45. If no character is in the input register, a new delay line circulating period is metered by counter 104 to begin instantly at the end of the previous one as flip-flop 45 is reset; if a character is in the register 40, flip-flop 45 is set and a loading period of eight SC pulses (true state of flip-flop 107) is interposed between the end of a counting cycle and the beginning of another one.

At the end of a false period $\overline{107'}$ the eight bits of a character set into the delay line during the previous period 107′, have been reset again into the delay line. In the then following true signal period 107′ another character can be shifted into the delay line, etc. Thus a character is always set into the delay line to follow therein the character set previously into it. As a character is set into the input register 40, all characters already held in the delay line will appear to be advanced by eight bit positions in relation to the delay clock to permit the eight bits of a character held in register 40 to be placed at the end of the already circulating bits. This advancing of characters in the delay line is simulated by temporarily enlarging the circulation period as metered by counter 104 by a character loading period.

It is now necessary to explain the change in format in that a bit is being added to each character. Stage 40–0 is permanently set after eight shifting pulses SC enabled for a duration of true 107′ signal; this one-bit is in stage 40–9, and at that time it is not shifted into the delay line 101. As the next character is shifted from register 40 into the delay line 101, the first bit of such character is always the one-bit held in stage 40–9. This one-bit serves as a marker to facilitate controlling the retrieval of a character from the delay line, as well as the metering of the content of the delay line.

Take now the beginning of a delay counter 104 cycle; it marks an instant at which the last bit of the last character has been set into the delay line for recirculation. There must never be more characters set into the delay line than it can hold, so that only at some time after the beginning of this or any other delay counter cycle, the first bit of the leading character will emerge from the delay line. Thus, the reset signal for delay counter 104 is also used to set a flip-flop 105, provided a gate 106 is enabled. The gating input for gate 106 is the reset output side of status flip-flop 65, which, as will be recalled is in the reset state as long as output register 60 can accept a character. The exact instance of emergence of the leading character during a delay counter cycle need not to be known and it varies with the state of filling of the transfer register-delay line, but it may happen rather soon.

As long as status flip-flop 65 is reset, control flip-flop 105 can be set after the respective last character has been recirculated; it will not occur as long as status flip-flop 65 is set. Flip-flop 105 when set places the switch 102 into branching position thus interrupting the recirculation path. The first leading character subsequently emerging from the delay line is shifted serially into the output register 60, enabled for serial shifting as long as status flip-flop 65 is in the reset state. The set-state of flip-flop 105 may be used in the alternative to enable serial shifting of a character into register 60.

As the leading bit is a one bit with certainty, it will occupy the status flip-flop 65 when the information bits of the character (including parity bit) are properly set into the seven other stages of register 60. This one-bit turns status flip-flop 65 on instantly, which in turn resets flip-flop 105 before the next clock pulse SC, switch 102 reverses and the next bit of the previously second, now leading character is recirculated while the previously leading character is held in register 60 for withdrawal. Tach pulse (recording) or computer clock (reading) will cause parallel transfer of the character thereby causing status flip-flop 65 to be reset. The reset state of flip 65 is then again a preparatory or gating signal for gate 106 to wait for the beginning of the next delay counter cycle as marked by the successful resetting of counter 104.

It is apparent that the number of a marker-one bits loaded into the delay line during each delay counter cycle is a measure of the number of characters held in the delay line 101 and the register 40, if any. The character just loaded into the output register 60 is not counted as it may or may not be removed therefrom during this metering period. Hence, the content of output register 60 is best not used here to provide for motor control.

To meter the content of the delay line, character clock pulses CC are used. They are produced always at the instant when a marker bit (bit value one) is set into the delay line to precede the next character. Hence. coincidence of a character clock pulse CC and of a one bit at the input side of the delay line marks presence of a character in the buffer system which includes delay line and input register; absence of a one bit at that instance denotes an "open position" in the buffer.

The result of this test may be used in an analogous manner as was explained with reference to FIGURE 5 in that a character-present signal provides for an accelerating current for motor 30 and a character-absent signal decelerates the motor, so that a somewhat more than half full buffer causes the motor to run at normal speed. This is the record mode; for the read mode the polarities are reversed: empty character positions cause acceleration, filled positions cause deceleration.

Figure 8:
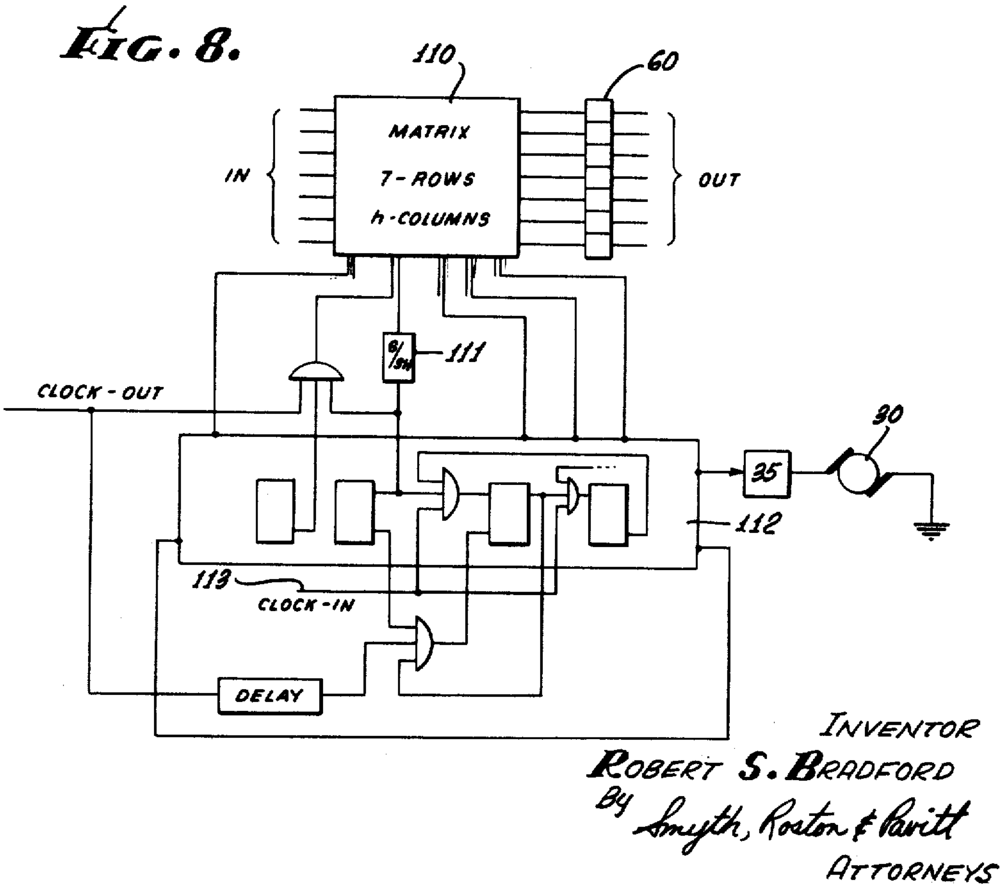
FIG. 8 illustrates salient portions of another embodiment of the invention using a non-shifting buffer for the transfer of digital data.

With reference to FIGURE 8, it shall be explained briefly, that a purely static buffer system can be used, with no shifting being involved. Reference number 110 in FIGURE 8 denotes a conventional storage matrix, having seven rows and *n* columns to hold *n* characters of seven bits each.

Data read-in wires of the matrix rows connect to the input side of the transfer system, data read out wires of the matrix rows connect to the output register 60. A shift register 112, connected in ring counter configuration, keeps track of the loading and unloading of matrix buffer 110. The register 112 has *n* stages constituting the status flip-flops, and these stages are controlled in such a manner that an input clock from line 113 (computer clock for recording, tach pulse for reading) sets any stage of register 112 the respective succeeding stage is not set and the respective preceding stage is set. Each register state triggers a monovibrator such as 111 causing temporary energization of a read-in column wire to concurrently load the bits, then applied to the input row wires, into the storage places at the intersections of the thus enabled column wire and input wires.

A character can be withdrawn from that column in buffer 110 the respetcive status flip-flop of which is set but has a preceding status flip-flop in the reset state within the chain of status flip-flops that define register 112. Thus, if X denotes a storage column governed by a status flip-flop $x$, then column X can be read if the condition $x \cdot \overline{(x-1)}$ is true. A character, of course, is clocked out of buffer 110 by a tach clock signal for recording or by a computer clock signal for reading, whereby each column is governed for read out enabling by the set side of its status flip-flop and the reset side of the respective preceding status flip-flop. The status flip-flops of register 112 are reset by a similar rule in that a readout clock pulse, slightly delayed or at its falling edge, can reset a flip-flop the respectively preceding flip-flop is already in the reset state. As the row wires traverse all columns it may be necessary to inhibit the read-in process for the duration of a read out clock signal and vice versa by using the respective clocks as inhibiting signals for the respective other process.

The number of stages of register 112 which are set or reset are used to control the motor 30 as aforedescribed.

The invention is not limited to the embodiments described above but all changes and modifications thereof not constituting departures from the spirit and scope of the invention are intended to be covered by the following claims.

I claim:

1. A data transfer system for being interpositioned between a digital data processing input/out system and a recording and reproducing unit cooperating with a movable data storage medium, including:
- means for driving said movable data storage medium past the recording and reproducing unit;
- a data storage buffer connected to selectively receive data from said data processing system and said reproducing unit, and to respectively deliver data selectively to said recording unit and said data processing system;
- means responsive to the extent said buffer is loaded and providing a signal representative thereof;
- means for selectively deriving first timing signals from the processing system and from the driving means;
- means for providing second timing signals at a higher frequency than the first timing signals;
- means for obtaining a passage through the buffer of the data in the buffer at the frequency of the second timing signals to make the data available for instantaneous transfer from the buffer;
- means for controlling the flow of data into said buffer in synchronism with the first timing signals selectively derived from the processing system and from said driving means;
- means for controlling the flow of data out of said buffer in synchronism with timing signals selectively derived from said driving means and from said processing system; and
- means for controlling said driving means in response to said buffer load representing signal.

2. A data transfer system for interpositioning between a digital data processing input/output system and a recording and reproducing unit cooperating with a movable data storage medium, including:
- means for driving said movable data storage medium past the recording and reproducing unit;
- a data storage register connected to selectively receive data from said data processing system and said reproducing unit, and to respectively deliver data selectively to said recording unit and said data processing system;
- means responsive to the extent said register is loaded and providing a signal representative thereof;
- means responsive to the rate at which said register is being loaded and providing a signal representative of said rate; and
- means for controlling said driving means in response to said load representing signal and said rate representing signal.

3. A digital data transfer system, for transferring digital data from a first data issuing system to a second data accepting system, including:
- first means responsive to signals accompanying the issuing of data by said first system;
- second means responsive to signals accompanying the acceptance of data by said second system;
- a buffer for receiving said issued data and placing them into locations permitting acceptance by said second system;
- two-way counting means to count the number of characters fed into said buffer and to subtract therefrom the number of characters withdrawn from said buffer;
- means for selectively controlling the data issue rate and the data acceptance rate in response to the counting state of said counting means; and
- means for transferring the data in the buffer to a position in the buffer for instantaneous transfer to said second system.

4. A data transfer system for interpositioning between a digital data processing input/output system and a recording and reproducing unit cooperating with a movable data storage medium, including:
- means for driving said movable data storage medium past the recording and reproducing unit;
- a data storage buffer connected to selectively receive data from said data processing system and said reproducing unit and to respectively deliver data selectively to said recording unit and said data processing system;
- means responsive to the extent said buffer is loaded and providing a signal representative thereof;
- means for starting said driving means in dependence upon at least one predetermined number of characters held on said buffer; and
- means for controlling the acceleration of said driving means in dependence upon the rate of change of loading condition of said buffer.

5. In a digital data transfer system,
- a buffer for receiving the bits of a plurality of characters and permitting withdrawal of such characters, individually and independent from the rate of receiving;
- means for transferring all of the bits of the characters in the buffer to a position in the buffer for the instantaneous transfer of such bits from the buffer;
- a bidirectional counter responsive to the number of characters passed into the buffer and subtracting therefrom the number of characters withdrawn from the buffer to provide a signal representative of the number of characters held in the buffer; and
- signal means responsive to said number representing signal to control the difference in rates between character supply and withdrawal and to prevent the buffer from complete depletion from and complete filling with characters.

6. In the digital data transfer system set forth in claim 5, means being provided for sensing the rate at which characters are introduced into the buffer to control the operation of the signal means in controlling the rate at which characters are withdrawn from the buffer.

7. In a digital data transfer system,
- a buffer for receiving the bits of a plurality of characters and permitting withdrawal of such bits of such characters, individually and independent from the rate of receiving;
- first signal means responsive to the difference in numbers of characters passed into the buffer and withdrawn therefrom to provide a first signal having characteristics representative of such differences;
- second signal means responsive to the rate at which the characters are passed into the buffer to provide a second signal having characteristics representative of such rate; and control means to selectively control the rate of character flow into the buffer and the rate of character withdrawal therefrom in response to the characteristics of the first and second signals from said first and second signal means.

8. In the digital data transfer system set forth in claim 7, the buffer constituting a recirculating delay line having input and output ends and means being provided for withdrawing the characters from the output end of the buffer and for inserting the characters into the input end of the buffer.

9. In a digital data transfer system, a buffer having input and output ends for receiving the bits of a plurality of characters at the input end and permitting withdrawal of such characters from the output end, individually and independent from the rate of receiving;

signal means responsive to the difference in numbers of characters passed into the buffer and withdrawn therefrom to provide a signal having characteristics representative of such difference;

control means to selectively control the rate of character flow into the buffer and the rate of character withdrawal therefrom in response to the characteristics of the signal from said signal means;

means for selectively stopping character inflow and withdrawal in dependence upon predetermined numbers of characters held in the buffer; and means for transferring all of the characters in the buffer to the output end of the buffer for providing an instantaneous withdrawal of the characters from the output end of the buffer.

10. In the digital data transfer system as set forth in claim 9, second means responsive to the rate at which characters are flowing into the buffer to provide a second signal having characteristics representative of such rate and the control means being responsive to the rate of character flow into the buffer to control the rate of character flow from the buffer.

11. The data transfer system as set forth in claim 10 wherein means are provided for determining the relative rates at which characters are introduced into the input register of the buffer and transferred from the output register of the buffer to provide a signal having characteristics representative of such relative rates and wherein the control means are responsive to the signal having characteristics representative of such relative rates to control the passage of the characters through the buffer.

12. In a digital data transfer system, a buffer for receiving the bits of a plurality of characters and permitting withdrawal of such characters, individually and independent from the rate of receiving;

signal means for tracing a character when passing through said buffer;

control means for controlling the passage of a respective preceding character through the buffer;

means connected to said signal means for sampling the number of characters held in said buffer; and means for selectively controlling the rate of character inflow and outflow in response to said number.

13. A data transfer system for being interpositioned between a digital data processing input/output system and a recording and reproducing unit cooperating with a movable data storage medium, including:

a data storage buffer having an input register, a transfer register, and an output register, said input register sequentially receiving characters, said transfer register shifting such characters individually from the input register to the output register and the output register holding such characters until withdrawal from the buffer;

signal means to provide a representation of the location of a character as received by said input register, passed through said transfer register and held in said output register;

control means connected to said signal means to control the passage of a character through said buffer in dependence upon the passage of a preceding character as it passes through said buffer;

means for driving said movable storage medium past the recording and reproducing unit in response to said signal means as it provides representation of all characters held in said buffer; and means for selectively connecting said input and output registers to said data processing system and said reproducing unit or vice versa.

14. The data transfer system as set forth in claim 13 wherein means are provided for obtaining a transfer of all of the characters at a relatively rapid rate from the input register to the transfer register and then to the output register so that all of the characters can be instantaneously transferred from the output register.

15. A data processing system for cooperation with a magnetic tape reproducing system, the magnetic tape having a plurality of parallel data tracks holding recorded characters defined by a plurality of bits sequentially disposed in parallel bit positions, said characters arranged serially in accordance with the tracks, including:

a stationary reproducing station arranged across said tape to simultaneously read data from the plurality of parallel data tracks;

means for advancing said tape past said reproducing station;

means coupled to said advancing means and developing a pulse train having a frequency proportional to and in excess of the rate of passage of characters past said reproducing station by at least one order of magnitude;

means responsive to the first bit of a character as it is detected by said reproducing station;

counter means connected to said first-bit-responsive means and being enabled by said first bit detection to count a fixed number of pulses of said pulse train and produce a control signal representative of this fixed pulse count;

a parallel register having an enabling circuit and being connected to said reproducing station to receive bits upon occurrence of said output signal;

a second register receiving the content of said parallel register;

means for withdrawing data from the second register independently from the rate of loading said parallel register; and means for controlling said tape advancing means to the extent the second register is loaded.

16. The data processing system set forth in claim 15, including, means for offsetting any skew of the data in the parallel data tracks across the tape.

17. The data processing system set forth in claim 16 wherein gaps are provided on the tape between different characters recorded on the tape and wherein means are provided for advancing the tape through the gaps between successive characters on the tape to obtain the reproduction of the successive characters on the tape.

18. A data recording control system wherein data are to be recorded on a movable storage medium capable of storing reproducible data bits in at least one track, including:

motor means for driving said storage medium;

a control circuit for said motor means including a two directional counter, the counting state thereof resulting in an output signal fed to said motor means for controlling said motor means;

a data buffer receiving data bits to be recorder, storing same temporarily and delivering them to locations permitting withdrawal for recordation;

means for delivering counting pulses to said counter to meter the quality of data received by said buffer, such counting pulses to be counted in one direction;
means for delivering counting pulses to said counter to meter the quantity of data withdrawn from said buffer, such pulses to be counted in the opposite direction; and
means for stopping the motor means when the data bits stored in the data buffer decreases below a particular value.

19. The data recording control system set forth in claim 18 wherein means are provided for accelerating the motor means in accordance with increases in the data bits being stored in the data buffer.

20. A data reproducing control system wherein data are reproduced by transducer means coacting with a movable storage medium capable of storing reproducible data bits in at least one track, including:
motor means for driving said storage medium;
a control circuit for said motor means including a two directional counter, the counting state thereof resulting in an output signal fed to said motor means for controlling said motor means;
a data buffer receiving data reproduced by said transducer means, storing same temporarily and delivering them to a location permitting withdrawal for processing;
means for delivering counting pulses to said counter to meter the quantity of data received by said buffer, such counting pulses to be counted in one direction; and
means for delivering counting pulses to said counter to meter the quantity of data withdrawn from said buffer, such pulses to be counted in the opposite direction.

21. The data reproducing control system set forth in claim 20 wherein means are provided for transferring all of the data in the data buffer to the location permitting withdrawal for processing.

22. The data processing system set forth in claim 21 wherein means are provided for determining the relative difference in the counting pulses counted in the one direction and the counting pulses counted in the opposite direction and for providing a controlled acceleration of the motor means in accordance with such relative difference.

23. In an output system for a data processing system including a movable storage medium having data characters recorded on the medium at progressive positions in the direction of movement where each data character is defined by a plurality of bits, including:
a buffer having input and output sides and constructed to shift a data character defined by a plurality of bits from its input to its output sides;
means for connecting the input side of the buffer to said data processing system to receive sequentially individual data characters from said data processing system in accordance with the movements of the storage medium;
means for determining the extent the buffer is loaded and providing a signal representative thereof; and
means for withdrawing data from the output side of said buffer at a rate determined by said signal.

24. An output system for a data processing system to process data characters defined by a plurality of data bits and to record such data characters on a movable storage carrier, including:
a buffer having input and output sides and constructed to shift the data characters defined by a plurality of data bits from its input side to its output side;
means for connecting the input side of the buffer to said data processing system to receive therefrom sequentially individual data characters;
transducer means for providing recording signals for storing on the movable storage carrier;
means for moving said storage carrier;
means responsive to the movement of said movable storage carrier for metering speed independently from the passage of fixed increments of said carrier past said transducer means thereby determining the recording rate;
means for transferring the characters in the buffer to the output side of the buffer to provide for an instantaneous withdrawal of such characters from the buffer;
means for withdrawing characters from said buffer as determined by said signals from said metering means;
means for determining the extent the buffer is loaded and providing a signal representative thereof; and
means for controlling said moving means in dependence upon said load representing signal by decelerating said moving means when the buffer content falls below a limit while accelerating said moving means as the buffer tends to fill up.

25. An output system for a data processing system to process data characters defined by a plurality of data bits and to record such data characters on a movable storage carrier, including:
a buffer having input and output sides and constructed to shift a data character defined by a plurality of data bits from its input side to its output side;
means for connecting the input side of the buffer to said data processing system to receive therefrom sequentially individual data characters;
transducer means for providing recording signals for storing on the movable storage carrier;
means for moving said storage carrier;
a digital tachometer coupled to said moving means for metering speed independently from the passage of fixed increments of said carrier past said transducer means thereby determining the recording rate;
means for withdrawing characters from said buffer as determined by said tachometer signals;
means for determining the extent the buffer is loaded and providing a signal representative thereof;
means for controlling said moving means in dependence upon said load representing signal; and
means for stopping the moving means upon the storage of less than a particular number of characters in the buffer.

26. An input system for a data processing system including:
a buffer having input and output sides and constructed to shift data characters from its input side to its output side; each character being defined by a plurality of data bits;
means for connecting the output side of the buffer to said data processing system to deliver thereto sequentially individual data characters upon demand by said processing system;
means for determining the extent the buffer is loaded and providing a signal representative thereof; and
means for feeding characters to the input side of said buffer at a rate determined by said signal.

27. The input system set forth in claim 26 wherein storage means are provided for obtaining the feed of the characters to the input side of the buffer and wherein means are responsive to the relative rate of delivery of characters from the buffer and the feeding of characters into the buffer to control the rate at which the characters are fed to the input side of the buffer.

28. The input system set forth in claim 26 wherein means are provided for transferring the characters in the buffer from the input side of the buffer to the output side of the buffer at a relatively rapid rate to provide for an instantaneous withdrawal of characters from the buffer.

29. An input system for a data processing system to process data characters defined by a plurality of data bits and stored on a movable data storage carrier, including:
a buffer having input and output sides and constructed to shift data characters from its input side to its output side, each character being defined by a plurality of data bits;

means for connecting the output side of the buffer to said data processing system to deliver sequentially to the data processing system individual data characters upon demand by said processing system;

means for providing a movement of the movable storage carrier;

transducer means for reading characters from the movable storage carrier;

means responsive to the movement of the moveable storage carrier for producing a train of pulses at a rate dependent upon the speed of the carrier and considerably faster than the rate with which characters are read by said transducer;

means responsive to the first bit of a character transferred into the buffer from the storage carrier to count a predetermined number of said pulses from the occurrence of said first bit in accordance with the plurality of pulses in a character and to provide a gating signal at the end of said count; and means for feeding the bits of a character into said buffer upon occurrence of said gating signal.

30. An input system for a data processing system to process data characters defined by a plurality of data bits and stored on a movable data storage carrier, including:

a buffer having input and output sides and constructed to shift data characters from its input side to its output side;

means for connecting the output side of the buffer to said data processing system to deliver sequentially to the data processing system individual data characters upon demand by said processing system;

means for determining the extent the buffer is loaded and providing a signal having characteristics representative of such loading;

transducer means for reading characters from the storage carrier and feeding such characters to the input side of said buffer;

means for providing a controlled movement of the data storage carrier;

means for moving said storage carrier in dependence upon the characteristics of said load representing signal; and means for operating upon the carrier-moving means to cause the carrier to stop when the buffer load exceeds a predetermined quantity of characters.

31. A digital data transfer system for transferring digital data from a first data issuing system to a second data accepting system, including:

first means responsive to signals accompanying the issuing of data by said first system;

second means responsive to signals accompanying the acceptance of data by said second system;

a shifting buffer receiving said issued data and shifting them into locations permitting acceptance by said accepting system;

two-way counting means to count the number of characters fed into said buffer and to subtract therefrom the number of characters withdrawn from said buffer;

means for determining the relative rates at which data is being issued by the first means and is being accepted by the second means; and means for selectively controlling the data issue rate and the data acceptance rate in response to the counting state of said counting means and to the relative rates at which data is being issued by the first system and is being accepted by the second system.

32. A data transfer system for interpositioning between a digital data processing input output system and a recording and reproducing unit cooperating with a movable data storage medium, comprising:

means for driving said movable data storage medium past the recording and reproducing unit;

a data storage register connected to selectively receive data from said data processing system and said reproducing unit and to respectively deliver data selectively to said recording unit and said data processing system;

means responsive to the extent said register is loaded and providing a signal representative thereof;

means for controlling said driving means in response to said load representing signal; and means for shifting data characters through said register at a rate in excess of the rates of data character reception and withdrawal upon delivery.

33. An output system for a data processing system to process data characters defined by a plurality of data bits and to record such data characters on a movable storage carrier, including:

a buffer having input and output sides and constructed to shift the data characters defined by a plurality of data bits from its input side of its output side;

means for connecting the input side of the buffer to said data processing system to receive therefrom sequentially individual data characters;

transducer means for providing recording signals for storing on the movable storage carrier;

means for moving said storage carrier;

means responsive to the movement of said movable storage carrier for metering speed independently from the passage of fixed increments of said carrier past said transducer means thereby determining the recording rate;

means for withdrawing characters from said buffer as determined by said signals from said metering means;

means for determining the extent the buffer is loaded and providing a signal representative thereof;

means for controlling said moving means in dependence upon said load representing signal by decelerating said moving means when the buffer content falls below a limit while accelerating said moving means as the buffer tends to fill up; and means for controlling said moving means to provide an inter-record gap on the movable storage carrier between the recordings of particular characters on the movable storage carrier.

34. The input system set forth in claim 33 wherein means are provided for advancing the characters through the buffer from the input side of the buffer to the output side of the buffer at a rate faster than the transfer of characters from the output side of the buffer to provide for an instantaneous transfer of characters from the output side of the buffer.

35. An input system for a data processing system defined by a plurality of data bits and stored on a movable data storage carrier with gaps between individual characters, a buffer having input and output sides and constructed to shift data characters from its input side to its output side, each character being defined by a plurality of data bits;

means for connecting the output side of the buffer to said data processing system to deliver to the data processing system sequentially individual data characters upon demand by said processing system;

means for providing a movement of the movable storage carrier to present different characters on the carrier for transfer to the buffer;

transducer means for reading characters from the movable storage carrier;

means responsive to the reading of the pluralities of bits in a character for obtaining a controlled movement of the carrier through the gap to position the carrier for the reading of the next gap by the transducer means; and means for controlling the movement of the carrier to transfer the successive characters on the carrier to the buffer in accordance with the transfer of characters from the buffer to the data processing system.

36. An input system as set forth in claim 35, including, means for transferring the characters through the buffer from the input side to the output side at a rate faster than the transfer of characters into and out of the buffer to provide for an instantaneous transfer of the characters from the buffer to the data processing system.

37. An input system as set forth in claim 36, including, means for determining the relative rate at which characters are transferred into and out of the buffer and means for controlling the movement of the movable storage carrier in accordance with such relative rate.

38. A system for transferring data characters between a movable storage carrier for the data and a data processor where the characters are formed from a plurality of data bits and are stored on the movable storage carrier with gaps between individual characters and where the characters are formed from pluralities of bits, a buffer having input and output sides and constructed to shift data characters from its input side to its output side;

means for connecting the input side of the buffer to a particular one of the movable storage carrier and the data processor;

means for connecting the output side of the buffer to the other one of the movable storage carrier and the data processor;

means for providing a movement of the movable storage carrier to provide for a transfer of different characters between the carrier and the buffer;

transducer means disposed relative to the movable storage carrier for providing a transfer of characters between the movable storage carrier and the transducer means during the movement of the movable storage carrier, the transducer means being connected to the buffer means to provide a transfer of the characters between the buffer means and the transducer means;

means responsive to the transfer of the pluralities of bits between the transducer means and the movable storage carrier for obtaining a controlled movement of the carrier through the gap to position the carrier for the transfer of the plurality of bits in the next carrier between the transducer means and the carrier; and means for controlling the movement of the carrier to obtain a transfer of successive characters between the output side of the buffer and the other one of the movable storage carrier and the data processor.

39. A system as set forth in claim 38, including, means for transferring the characters through the buffer from the input side to the output side at a rate faster than the transfer of characters into and out of the buffer to provide for an instantaneous transfer of the characters from the buffer to the other one of the movable storage carrier and the data processor.

40. A system as set forth in claim 38, including, means for determining the relative rate at which characters are transferred into and out of the buffer and means for controlling the movement of the movable storage carrier in accordance with such relative rate.

41. A system for transferring data characters between a movable storage carrier for the data and a data processor where the characters are formed from pluralities of bits in a substantially parallel relationship across the movable storage carrier, a buffer having input and output sides and constructed to shift data characters from its input side to its output side;

means for connecting the input side of the buffer to a particular one of the movable storage carrier and the data processor;

means for connecting the output side of the buffer to the other one of the movable storage carrier and the data processor;

means for providing a movement of the movable storage carrier to provide for a transfer of different characters between the carrier and the buffer;

transducer means disposed relative to the movable storage carrier for providing a transfer of characters between the movable storage carrier and the transducer means during the movement of the movable storage carrier, the transducer means being connected to the buffer means to provide a transfer of the characters between the buffer means and the transducer means;

means for controlling the movement of the carrier to obtain a transfer of successive characters between the transducer means and the buffer in accordance with the transfer of characters between the output side of the buffer and the other one of the movable storage carrier and the data processor; and means for offsetting any skew in the substantially parallel relationship across the movable storage carrier during the movement of the movable storage carrier.

42. The system set forth in claim 41 wherein successive characters on the movable storage are represented by a plurality of bits in the substantially parallel relationship and in the direction of movement of the bits along the movable storage carrier and wherein successive characters on the movable storage carrier are separated by an inter-record gap and wherein means are provided for producing a movement of the movable storage carrier through the inter-record gaps upon the completion of the transducing action on the successive characters to provide for a transducing action on the successive characters.

43. The system set forth in claim 42 wherein the characters are transferred through the buffer from the input side of the buffer to the output side of the buffer at a rate faster than the transfer of the characters from the output side of the buffer to the other one of the movable storage carrier and the data processor to provide for an instantaneous withdrawal of the characters from the output side of the buffer.

44. A data transfer system for interpositioning between a digital data processing input-output system and a recording and reproducing unit cooperating with a movable data storage medium where the data is recorded as characters each having a plurality of bits and where inter-record gaps are provided between successive characters, including:

means for driving said movable data storage medium past the recording and reproducing unit;

a data storage register connected to selectively receive data from said data processing system and said reproducing unit and to respectively deliver data selectively to said recording and reproducing unit and said data processing system;

means responsive to the extent said register is loaded to provide a signal representative of the extent of loading;

means for controlling said driving means in response to said load-representing signal; and means for controlling said driving means to move the storage medium through the inter-record gaps upon the delivery of the successive characters through the buffer between the recording and reproducing unit and the data processing system.

45. The data transfer system set forth in claim 44 wherein the data is recorded on the medium in a plurality of substantially parallel bits and wherein the characters are recorded on the medium in a plurality of substantially parallel bits and in a plurality of bits in the direction of movement of the storage medium and wherein means are provided for offsetting any skew in the medium to provide for a substantially simultaneous presentation of the parallel bits to the recording and reproducing unit.

46. A data processing system for interpositioning between a digital data processing input-output system and a recording and reproducing unit cooperating with a movable data storage medium where the data is recorded as characters each having a plurality of bits in substantially parallel relationship across the medium and in the direction of movement of the medium, means for driving the movable data storage unit past the recording and reproducing unit;

a data storage register connected to receive data selectively from said data processing system and said reproducing unit and to respectively deliver data selectively to said recording and reproducing unit and said data processing system;

means responsive to the extent said register is loaded to provide a signal representative of the extent of loading;

means for controlling said driving means in response to said load-representing signal; and means for compensating for any skew in the positioning of the movable data storage medium relative to the recording and reproducing unit during the movement of the medium past the recording and reproducing unit.

47. A data processing system set forth in claim 46 wherein means are provided for sensing the rate at which data is received in said regitser and delivered from said register and are connected to the controlling means to control the driving means in response to said relative rates.

References Cited

UNITED STATES PATENTS

| | | | |
|---|---|---|---|
| 3,267,437 | 8/1966 | Harwood | 340—172.5 |
| 3,162,839 | 12/1964 | Cypser et al. | 340—172.5 |
| 2,985,865 | 5/1961 | Merz | 340—172.5 |
| 2,960,683 | 11/1960 | Gregory et al. | 340—172.5 |
| 2,905,930 | 9/1959 | Golden | 340—172.5 |

PAUL J. HENON, *Primary Examiner.*

GARETH D. SHAW, *Assistant Examiner.*